INVENTOR.
ROBERT L. LEE
BY Beehler & Arant
Gene W. Arant
ATTORNEYS

ROBERT L. LEE
INVENTOR.
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Buehler & Aranto
Gene W. Aranto
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Buckhorn & Arant
Gene W. Arant
ATTORNEYS

INVENTOR.
ROBERT L. LEE
BY Buehler & Arant
Gene W. Arant
ATTORNEYS

INVENTOR.
ROBERT L. LEE
BY Beehler & Arant
Gene W. Arant
ATTORNEYS

INVENTOR.
ROBERT L. LEE
BY Beehler & Arant
Gene W. Arant
ATTORNEYS

United States Patent Office
3,452,439
Patented July 1, 1969

3,452,439

METHOD AND APPARATUS FOR TRANSFERRING RECORDED JAW MOVEMENT INFORMATION

Robert L. Lee, Colton, Calif., assignor of five percent to Gene W. Arant, Los Angeles, Calif., and ninety-five percent to Robert L. Lee and Arlene M. Lee, Los Angeles, Calif., as joint tenants Continuation-in-part of application Ser. No. 367,254, May 13, 1964. This application Aug. 1, 1966, Ser. No. 569,472
Int. Cl. A61c *19/04*
U.S. Cl. 32—32 9 Claims

ABSTRACT OF THE DISCLOSURE

A method and apparatus for recording and reproducing jaw movements.

Recording is done at two lateral locations which are located precisely on the extended hinge axis. A third frontal location may also be used. Recording transducers consist of a stylus and a solid record member in which physical impressions are made.

The transfer process (here claimed) involves transferring the recorded information to a pair of simulated upper joint members, also located precisely on the hinge axis, by forming openings in them. The information is transferred in two sequential steps, with the openings being formed in the first step and enlarged in the second step.

The simulated upper joint members are incorporated into an articulator for providing the desired jaw movement simulation.

The present application is a continuation-in-part of my prior copending application Ser. No. 367,254, filed May 13, 1964, which is to be abandoned.

The present invention relates to a method and apparatus for measuring, recording, and reproducing the jaw movements of a human being.

Jaw movement characteristics differ significantly from one individual to another, and therefore provide a very interesting subject for scientific study. One of the objects of the present invention is to provide an improved method and apparatus for measuring jaw movement characteristics, of greater accuracy than has heretofore been available, so that the state of scientific knowledge may thereby be advanced.

Of greater practical importance at the present time, however, is the application of jaw movement studies to the purposes of dentistry. The pioneer work of B. B. McCollum in this field was reported in "A Research Report," by B. B. McCollum and C. E. Stuart, Scientific Press, South Pasadena, Calif., 1955; and the later work of Stuart was also described in his article, entitled "Accuracy in Measuring Functional Dimensions and Relation in Oral Prosthesis," in the Journal of Prosthetic Dentistry, volume 9, No. 2, pages 220–236, March–April 1959. A comprehensive review of work in this field has recently been published in the book "Modern Gnathological Concepts," by Victor O. Lucia, The C. V. Mosby Company, St. Louis, 1961.

A great deal of dentistry is now done by the indirect method in which models of the patient's upper and lower tooth structures are mounted on a device known as an articulator, which has a hinge action that is supposed to simulate the jaw movement. Most of these instruments have no provision for simulating the individual jaw movement characteristics of the particular patient, however, and it is therefore only happenstance if dental work done on them will actually fit the patient. Some "fully adjustable" articulators have also been available, which are capable of simulating many of the known jaw movement characteristics. However, the problem has remained of determining just what particular settings to use on the articulator for each individual patient. Measurement and recording techniques employed for this purpose have left much to be desired.

It is significant to note that the power of the teeth to mechanically destroy the food being chewed necessarily involves, at least to some extent, the power to destroy themselves. Recent studies have shown that among groups of adults who have had the benefit of good dental services the main cause of loss of teeth is periodontal disease, and that one of the main causes of periodontal disease in turn is the malocclusion or imprope r placement of teeth in the mouth. It is also known that placement and shaping of the teeth so that good static interengagement is achieved is not enough, but rather, that good occlusion demands a proper dynamic interaction as well.

Accordingly, the use of the dental articulator as a means for reproducing and studying the dynamics of jaw movement has become increasingly recognized. When the adjustable settings on the articulator have been set to values which, in fact, properly represent the jaw movement characteristics of the particular patient, then it is a rather straightforward matter to determine whether a particular tooth is receiving such an overconcentration of the chewing load that it is likely to soon break down, or to break down its surrounding gum tissue.

Unfortunately, only a very few dentists have mastered the complexities of the fully adjustable articulators and the recording techniques which must be used in conjunction with them. And even so, many hours of the dentist's time have been required to measure and record the jaw movement characteristics, and to transfer the information thus obtained to the articulator or playback instrument. It is the belief of many dentists that this time-consuming procedure has made this type of dental service economically unfeasible for the majority of dental patients who might require it. In this connection it should be noted that reasonably accurate procedures have been available for measuring and recording jaw movement characteristics (see the Stuart Patent No. 2,814,876), but the procedures for transferring this information to the playback equipment have been complex and time-consuming and have involved many possibilities of error.

Another principal object of the present invention, therefore, is to provide a method for measuring, recording, and reproducing jaw movements, which is efficient and reliable and can be used for the purposes of practical dentistry.

Still a further object of the invention is to provide an efficient and reliable method for the direct physical transfer of jaw movement measurements to an articulator, or playback device.

Yet another object of the invention is to provide new and improved forms of apparatus for measuring jaw movements, for recording measurements of jaw movements, and for transferring jaw movement information to an articulator.

Yet a further object of the invention is to provide a dental articulator having the absolute minimum number of provisions for adjustment, and which is designed to accept recorded information in a form which will make such adjustments unnecessary.

The objects and advantages of the invention will be more fully understood with reference to the accompanying drawings.

*Drawings summarized*

Since the drawings are rather voluminous it will be helpful to briefly outline their general arrangement.

FIGURES 1 to 4 illustrate some general features of the preferred method and apparatus of the invention.

FIGURES 5 to 49, inclusive (Sheets 3 to 13 and 16), illustrate a complete set of apparatus for use in jaw movement recording in accordance with the invention, including clutches, face bow mounting means, face bows, and recording transducers; and transfer frames, alignment devices, simulated eminentia (or upper joint members), and condyle drills for use during information transfer.

FIGURES 50 to 59, inclusive, illustrates various stages of the recording and information transfer procedures, utilizing the apparatus of FIGURES 5 to 49.

FIGURES 60 to 69, inclusive, illustrate a dental articulator used in conjunction with the method and apparatus of FIGURES 5 to 59, inclusive, for reproducing the jaw movements.

FIGURES 70 to 72, inclusive, illustrate a first alternate form of recording apparatus in accordance with the invention;

FIGURES 73 to 76, inclusive, illustrate a second alternate form of recording apparatus in accordance with the invention;

FIGURES 77 to 78 illustrate a third alternate form of recording apparatus, and a complete set of recordings made therefrom;

FIGURES 79 and following illustrate still another form of jaw movement recording apparatus, representing the presently preferred form of the invention, together with its associated information transfer apparatus.

*Drawings enumerated*

The individual drawing figures are more specifically enumerated as follows:

FIGURE 78(*b*) is a perspective view of a similar set of recording wafers in which the border movements have been recorded;

*Established theory*

Figure 1:
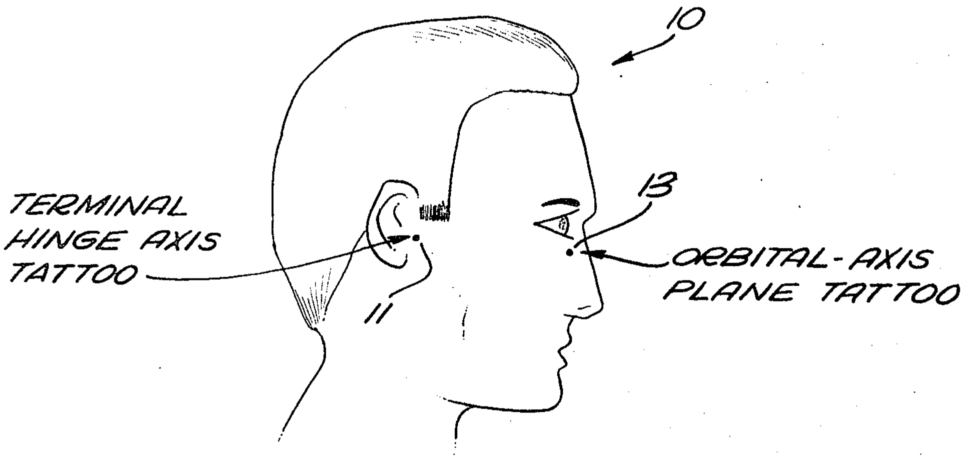
FIGURE 1 is a side view of a dental patient on whom reference marks have been tattooed as a basis for making jaw movement recordings.

Before describing the present invention it will be helpful to first make reference to certain accepted principles of gnathology which have provided a necessary foundation for the invention. The upper jaw or maxilla is a fixed and rigid part of the bony structure of the head, while the lower jaw or mandible is movable relative thereto. The lower jaw is suspended by the temporomandibular joints, which are a pair of essentially ball-and-socket type joints, each including a socket or eminentia which is a part of the upper jaw, and a ball or condyle which is a part of the lower jaw. It is well known that the shape of the condyle does not conform to a mathematically perfect ball or sphere.

The ball-and-socket joints of the jaws are characterized by the fact that the balls or condyles can move a considerable distance out of the sockets or eminentia. The particular movement of the lower jaw in which both of the condyles move out of their sockets at the same time is described as a protrusive movement. A twisting movement of the lower jaw to the left or right is referred to as a left lateral movement or a right lateral movement. It is also known that in a high percentage of individuals the lateral movements are accompanied by a significant transtrusive or Bennett shift movement, i.e., the initiation of the twisting action of the jaw to achieve a lateral movement is almost immediately accompanied by a lateral displacement, in which the condyles move either to the left or the right in their respective eminentia. A characteristic of a straight protrusive or forward movement of the mandible is that the condyles cannot move straight forward, but are compelled to drop downward due to the curvature of the eminentia. It is known that the muscles drive the condylar movements, while the bones and ligaments limit them, but the precise relationships are not well understood, nor have data been compiled on the average values of the various physical characteristics or the probable variations therefrom.

Present studies of jaw movement patterns have been made possible by the discovery of the terminal hinge axis, and of the physiologically reproducible nature of the centric relation. The terminal hinge axis is determined by having the subject open and close his mouth while keeping the lower jaw in its rearward or most retruded position, and observing the two points on respective sides of the subject's face which are stationary relative to both jaws. The centric relation is defined as the rearmost, uppermost, and midmost position of the lower jaw.

*Established practice*

For purposes of practical dentistry, using the indirect method, it is the established practice to make tattoo marks on the patient's face to use as reference points. Two tattoo marks are made on the sides of the face indicating the terminal hinge axis, and a third mark is made on the side of the nose in a somewhat arbitrary location to establish the orbital-axis plane.

In dental articulators it is an established practice to represent the condyle by a ball or sphere which is of mathematically perfect configuration. It is of course apparent that by accompanying jaw movement recordings with a conversion of the condyle from its true, imperfect shape to a simulated condyle of matematically perfect shape, the movement recordings related to the simulated condyle will necessarily reflect a corresponding conversion, the precise nature of which is not understood, however.

*Theoretical problems*

For the purposes of practical dentistry it is not only necessary to measure and record, and reproduce, the dynamic movements of the condyles, but it is also necessary to refer this information to the orbital-axis plane. The reason of course is that in preparing whatever restorations are to be made, whether full or partial, and placing them in the patient's mouth, the actual distance of each tooth from both the terminal hinge axis and the orbital-axis plane is significant in determining the configurations of the cusps which are prepared on the denture. Thus as has been well known the dynamic or movement information must be accompanied by static measurement information which relates the movements to the orbital-axis plane.

From a mathematical point of view it is known that to locate a single point in space requires three elements of information, corresponding to the measurements in space along three separate axes from any given initial reference point. Where movement of a point in space is being measured, six elements of information are required instead of three. It can be considered that the point being observed has moved to an alternate position, in which case three new measurements on the X, Y, and Z axes are required. Alternatively, the movement of the point to its new position may be represented by an arrow or vector, and in that case the length of the vector and the values of two angles associated with it will completely describe the change in position of the point. Thus it is seen that six elements of information are required to indicate that a point in space has moved to an alternate position.

In the problem at hand there are two condyles whose motion is to be observed, hence a total of twelve elements of information are required. Furthermore, both in accordance with prior practices, and in accordance with the present invention, it is not deemed feasible to measure the movements of the condyle itself by direct means, since this would involve physical operations on the patient which would be undesirable or unpermissible. According to present knowledge it therefore appears necessary to measure the condylar movements by indirect means, by observing the effect which these movements create in positions external to the subject's face. The problem is therefore presented that the indicated movement, measured at a point outside the face, is generally either an amplification or a compression or other distortion of the actual movement of the condyle itself.

More specifically, if a line or axis which passes through the two condyles is observed at points external to the subject's face, a straight protrusive or forward movement of the mandible will exhibit a movement of the line at the points of observation which will be linear and therefore equal to the actual movements of the condyles themselves. However, if the subject engages in either a left lateral or right lateral movement of his mandible, the observed points on the axis of the mandible will indicate either a degree of movement which is actually greater, or actually less, than that of the most closely associated condyle.

An additional complication which enters in where movements are observed at a point forward of the condyle itself, is that of a variable degree of jaw opening movement. It is known that the subject cannot move his mandible either forward or laterally without opening the jaws to at least some slight extent as this is necessary in order to disengage the teeth. The precise amount of opening necessary would not be known in advance in a particular case. However, there is the further complication that jaw opening cannot easily be measured at all because there is no conventient reference plane or reference point from which to measure it. As previously pointed out the protrusive or forward movement of the mandible necessarily causes the condyles to drop down because of the curvature of the eminentia. Thus, the mandible does not occupy a constant angular position relative to the orbital-axis plane, nor does the axis of the mandible remain at a fixed separation distance from the orbital-axis plane. So a reference for measuring jaw opening movement is essentially lacking.

It is therefore seen that while, from a purely theoretical standpoint, the condylar movements can be accurately measured by measuring six elements of information with reference to each condyle, nevertheless in actual practice the problem is severely complicated because of the necessity of making measurements outside the face, with the consequent amplifications, compressions, or distortions which will necessarily result.

*The invention*

Perhaps the most important objective of the invention is that all the jaw movement information be recorded directly from the patient, and be then transferred into the articulator, so that no arbitrary assumptions are built into the articulator itself. In achieving this objective the fundamental concept is that movements originating inside the head of the subject are utilized, on the basis of their external effects, by measuring and recording them in a plurality of external positions; the head of the subject is then replaced with the simulated head, or articulator; and the transducers which were utilized in the first instance are then operated in reverse, as playback devices, to create within the articulator or simulated head a pair of simulated temporomandibular joints which will accurately reproduce the jaw movements of the subject.

A second principle of the invention is that the three-dimensional movement of a point in space can best be measured directly at the locus of the point itself. While it would be possible to utilize electrical means for observing the movements of the point, in accordance with the present invention it is preferred to utilize a simple, physical-impression type of mechanical recording means for this purpose.

A third principle of the invention is that an advantage can be gained by making a separate recording of the protrusive movement, and a separate recording of the laterial or border movements, at precisely the same recording location, but sequentially with respect to time. The advantage of this procedure is that the cross-talk or interference between the lateral movements recording and the protrusive movement recording, which would be due to the distortion necessarily inherent in the lateral movements recording, is avoided. The information contained in the two or more separate recordings is all transferred into the simulated joints, one recording at a time.

A fourth principle of the invention, which is independent from and unrelated to any of the principles previously set forth, is that there is an advantage in guiding the movements of the subject's mandible during a protrusive movement recording, or during a recording of any jaw movement other than the lateral or border movements. It is preferred to utilize mechanical guide means for this purpose.

A fifth principle of the invention is that the easiest way to eliminate errors due to variations in jaw opening is to measure the condylar movements at points which are precisely located on the extended hinge axis, rather than at locations displaced therefrom. Thus, in accordance with the invention a pair of three-dimensional transducers are employed in lateral positions at the sides of the subject's face with the initial or reference recording position of each transducer being precisely aligned with the extended hinge axis. When the mandible moves to a different position one element of each transducer continues to represent the position of the terminal hinge axis (which is fixed relative to the maxilla or head), while the other element of each transducer represents the new position assumed by the extended axis of the mandible.

A sixth principle of the invention is that, in measuring condylar movements at two lateral locations on opposite sides of the face, it is advantageous to utilize at the corresponding locations a pair of transducer elements which are rigidly supported at a fixed separation distance, so that movement of one of the elements will necessarily be accompanied by a corresponding movement of the other element. This principle is based on the assumption that the lower jaw or mandible does not stretch, and that the distance between the condyle centers is a fixed distance. The measurement transducers positioned at extended locations and rigidly supported with a fixed separation distance therefore more nearly represent the condyles themselves, than if such rigid support were not supplied.

A seventh principle of the invention is that separate recording of the protrusive movement, in conjunction with a physical-impression type of recording, may be advantageously used to transfer static as well as dynamic information directly from the recordings. This is true because one of the extreme limit positions of the protrusive movement recording clearly and reliably represents the centric relation (i.e., the axis of the mandible coinciding with the terminal hinge axis and with the mandible also being in its uppermost position). The use of this principle greatly facilitates carrying out the fundamental objective and concept of the invention initially set forth above.

An eighth principle of the invention is that the use of physical-impression type recordings greatly facilitates the transfer of the jaw movement information, by direct physical means and semiautomatic procedure, into a dental articulator for the purpose of there reproducing the movements.

A ninth principle of the invention is that, in making physical-impression type recordings, there is a great advantage in utilizing an elongated stylus having a hemispherical end capable of forming such impressions. The mathematical concept of the recording then is that the locus of the recording is inside the stylus, and more specifically, at the radius center of its hemispherical end. As the stylus moves in three dimensions relative to the record member, and also changes its angular position in three dimensions relative to the record member, the impression being created in the record member is always the same distance from the locus of the recording point, namely, a distance equal to the radius of the hemispherical end of the stylus.

A tenth principle of the invention is that, when utilizing physical-impression type recordings, best results are achieved by supporting the two lateral record members from the upper jaw and the two lateral recording stylii from the lower jaw, and positioning the lateral stylii horizontally and preferably coincidental with the terminal hinge axis. It has been found from long experimentation that if the stylii are vertical, or if they are supported from the upper jaw, the variations in the subject's jaw opening create practical difficulties which are not easily overcome.

Other principles of the invention will appear from the detailed description and the drawings.

*Mechanical principles*

It is preferred to use a rigid plastic material for the record member and a rotating drill as the recording stylus, and to substitute a smooth-surfaced pin for the drill when information is to be reproduced or played back. It has been found that fiberglass resin is the best material presently available for the record members.

The principle of symmetry is used throughout the procedures to insure accuracy. That is, all measurements at the lateral positions are referenced to the lateral centers both of the subject's head and of the instrument.

A novel pair of transfer frames are utilized, together with novel means for aligning the frames to each other, and novel means for attaching them to respective face bows in positions referenced both to the terminal hinge axis and to centric.

Other mechanical principles of the invention will appear from the detailed description.

*Outline of apparatus*

In order to make the later detailed description of the apparatus more readily understandable, it is helpful at this point to describe briefly the principal parts of the apparatus and the purposes for which they are used.

During jaw movement recording a pair of face bows are used, which are of generally horseshoe-shaped configuration, there being an upper face bow which is secured to and moves with the head or upper jaw, and a lower face bow which is secured to and moves with the lower jaw or mandible. Separate clutches or bite pieces are secured to the upper and lower tooth structures, respectively, and each face bow is secured to its associated clutch by means of an adjustable mounting apparatus.

A set of three measurement transducers are also utilized during recording, each transducer being a two-element device, with one of the elements being carried by the upper face bow and the other being carried by the lower face bow. Although the method of the present invention is not necessarily restricted to their use, the transducers illustrated in the present drawings are of the type which includes a solid record member capable of having physical impressions formed therein, and an elongated stylus adapted to form such impressions. In the illustrated apparatus the record members are secured to and carried by the upper face bow, while the recording styli are secured to and carried by the lower face bow.

In the information transfer apparatus, the primary structural elements are a pair of upper and lower transfer frames. These transfer frames are adapted for direct securement to the corresponding face bows, although in some instances the transfer frame may be secured to the transducer elements, i.e., record members or their holding boxes, or styli or their supporting carriages, which are associated with the respective face bow. It is significant, however, that the transfer frames are not connected to the clutches, or to the adjustable mounting means by which the face bows are supported from the clutches.

Therefore, during information transfer the transfer frames are not only substituted in place of the head of the human subject, but are additionally substituted in place of the clutches and adjustable mounting means by which the face bows were formerly supported from the subject's head. This significant innovation is made possible by the method of carrying static as well as dynamic information values in the transducer recordings, and it is also made possible by virtue of the novel means associated with the transfer frames for maintaining an index or reference to the terminal hinge axis, as well as to the orbital-axis plane.

Thus the complete transfer apparatus also includes an upper pair of axis alignment posts, which are attached to the upper transfer frame, and a lower pair of axis alignment posts, which are attached to the lower transfer frame. Means are also provided for aligning the lower end of each of the upper axis alignment posts with the upper end of its respectively associated lower axis alignment post. The information transfer apparatus additionally includes means for providing a pair of simulated temporomandibular joints. The primary elements involved here are a pair of blank records which are adapted to be formed so as to provide a pair of simulated eminentia, or upper joint members; and a pair of simulated condyles, having the usual ball or spherical configuration, and which are capable of being actuated so as to form the surfaces of the simulated eminentia. The most practical means thus far discovered of forming the eminentia, and which is the only means illustrated in the present drawings, is utilizing simulated condyles which have grooved surfaces providing drills, and which are drivingly rotated so as to cut away portions of material from the surfaces of the simulated eminentia.

Figures 5, 6, 7, 8, 9, 10:
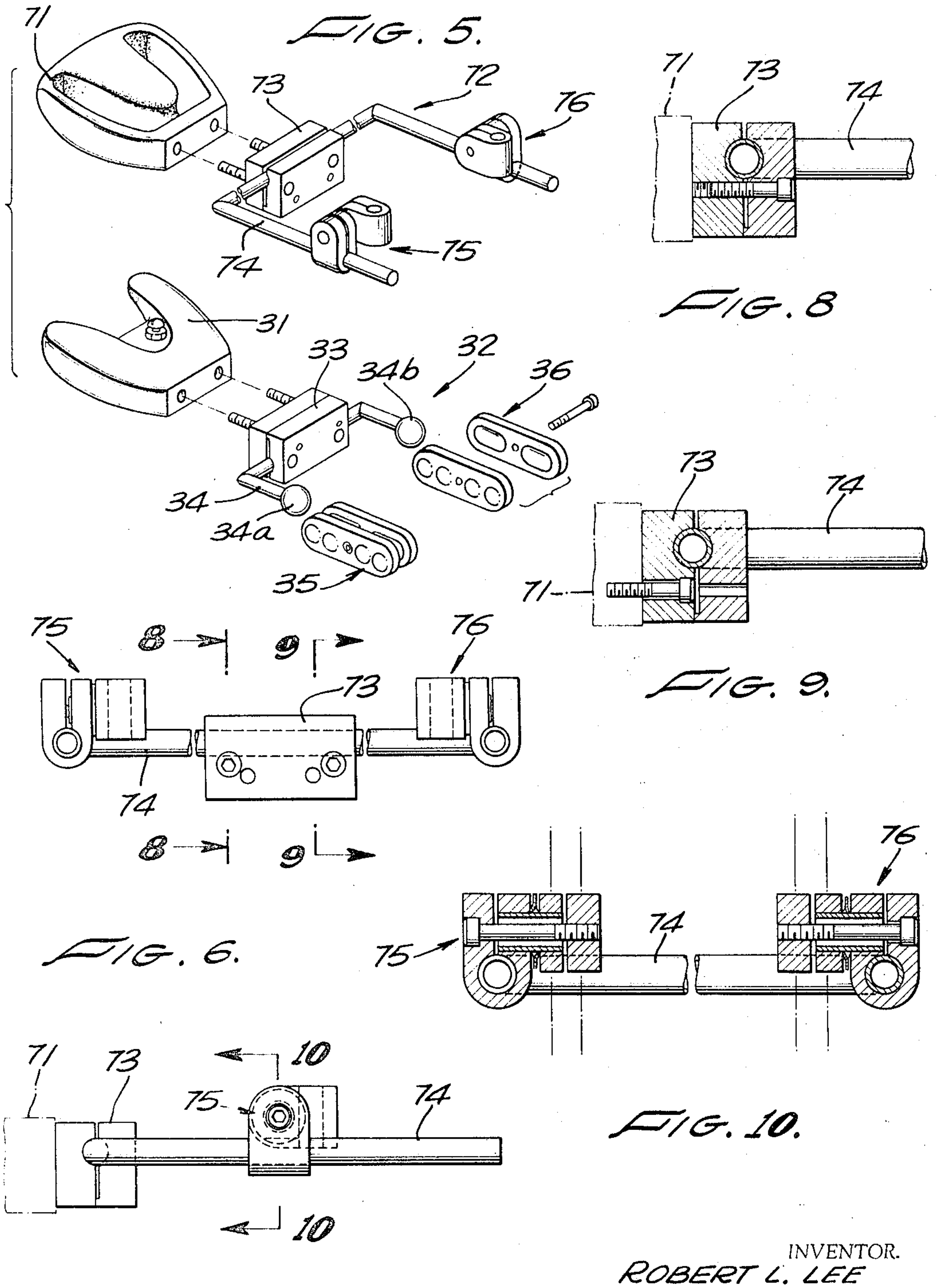
FIGURE 5 is a front perspective view, partially exploded, illustrating the upper and lower clutches and the mounting means for the upper and lower face bows.
FIGURE 6 is a front elevational view of the mounting means for the upper face bow.
FIGURE 7 is a side elevational view of the mounting means for the upper face bow.
FIGURE 8 is a cross-sectional view taken on the line 8—8 of FIGURE 6.
FIGURE 9 is a cross-sectional view taken on the line 9—9 of FIGURE 6.
FIGURE 10 is a cross-sectional view taken on the line 10—10 of FIGURE 7.
Figures 11, 12, 13, 14, 15, 16, 17:
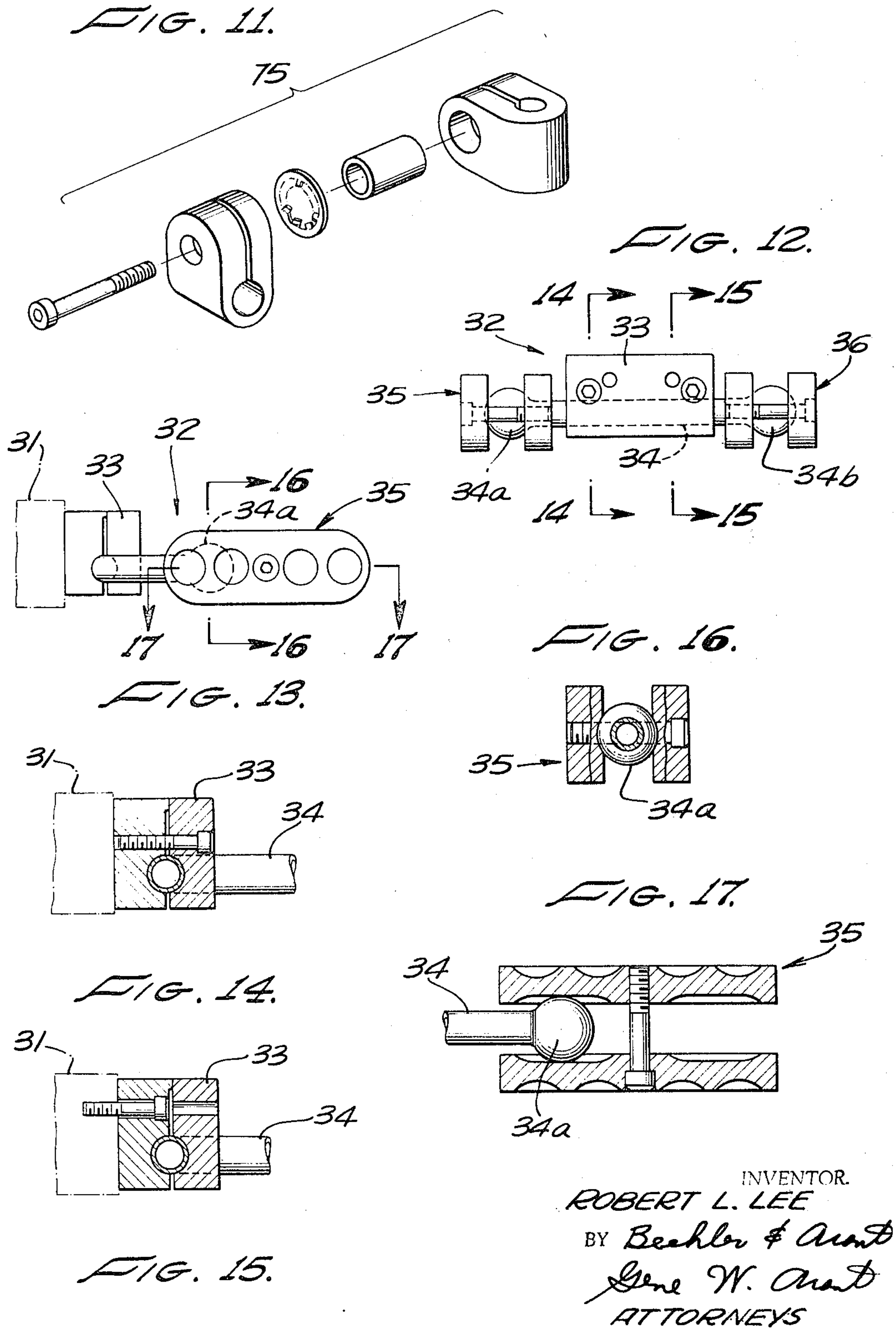
FIGURE 11 is an exploded perspective view of one of the universal joints of the mounting means for the upper face bow.
FIGURE 12 is a front elevational view of the mounting means for the lower face bow.
FIGURE 13 is a side elevational view of the mounting means for the lower face bow.
FIGURE 14 is a cross-sectional view taken on the line 14—14 of FIGURE 12.
FIGURE 15 is a cross-sectional view taken on the line 15—15 of FIGURE 12.
FIGURE 16 is a cross-sectional view taken on the line 16—16 of FIGURE 13.
FIGURE 17 is a cross-sectional view taken on the line 17—17 of FIGURE 13.
Figure 69:
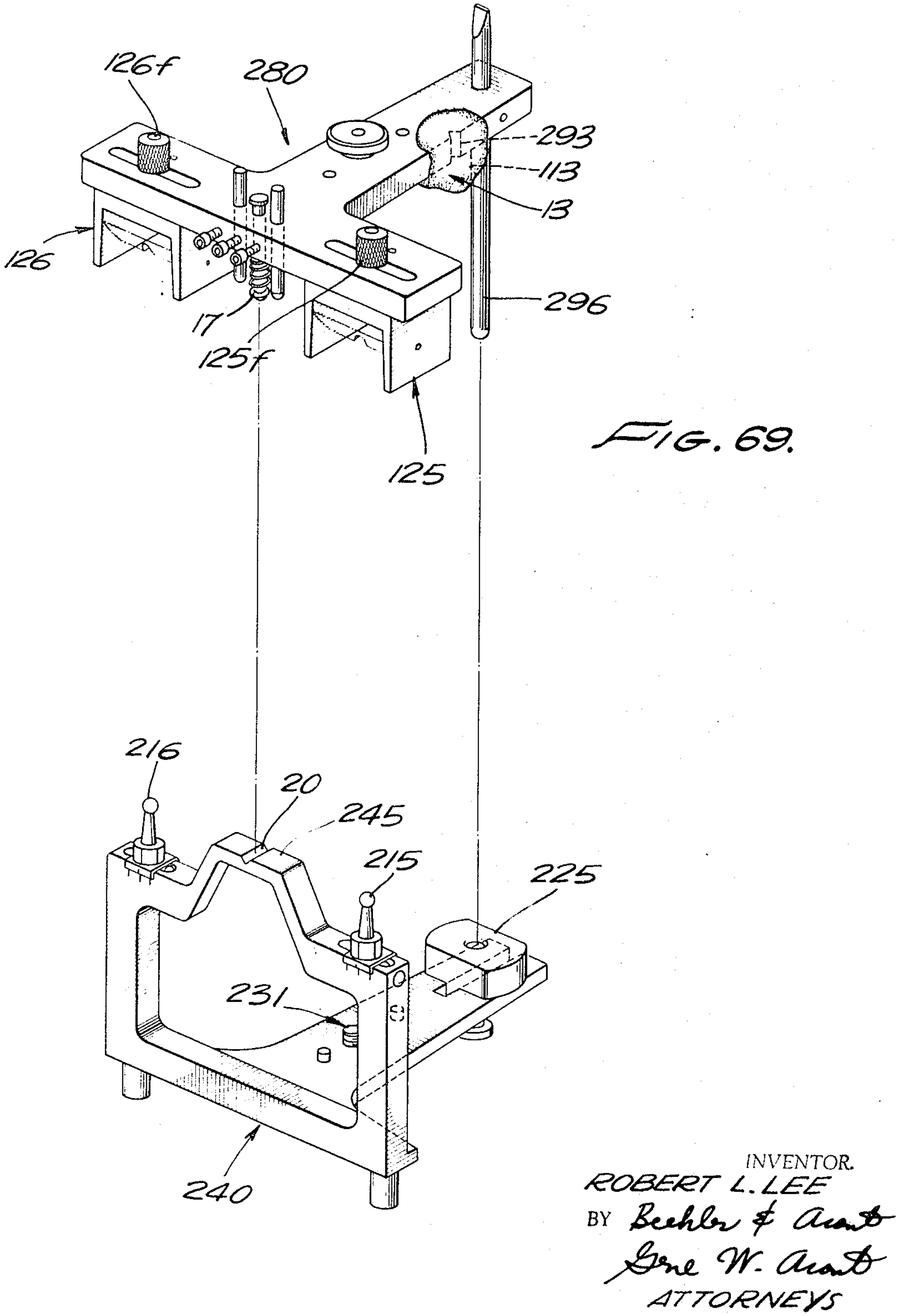
FIGURE 69 is an exploded perspective view of the articulator in a form ready to receive dental models.

In accordance with the principal embodiment of the invention, which is fully illustrated in FIGURES 5 to 69, inclusive, of the drawings, a separate articulator or playback apparatus is not required. In accordance with this embodiment of the invention the upper transfer frame provides an upper mounting plate which can receive a model of the upper tooth structure, and a lower mounting plate may be attached to the lower face bow to provide a mounting for a model of the lower tooth structure. After the simulated eminentia have been prepared it is then possible, simply by removing from the face bows at least one element of each of the three motion measurement transducers, to utilize the cooperatively interconnected face bows and transfer frames for playback or articulation purposes. The advantages of such a method or procedure are, however, considered to be rather limited.

Therefore, in FIGURES 60 to 69 of the drawings there is also illustrated a separate articulator, the design and arrangement of which is compatible with the transfer apparatus of the principal embodiment of the invention, and to which the simulated eminentia may be attached. This articulator is generally conventional insofar as its lower frame and simulated condyles are concerned, but has a number of novel and significant features incorporated in its upper frame and in the construction and arrangement of the simulated eminentia.

Figure 81:
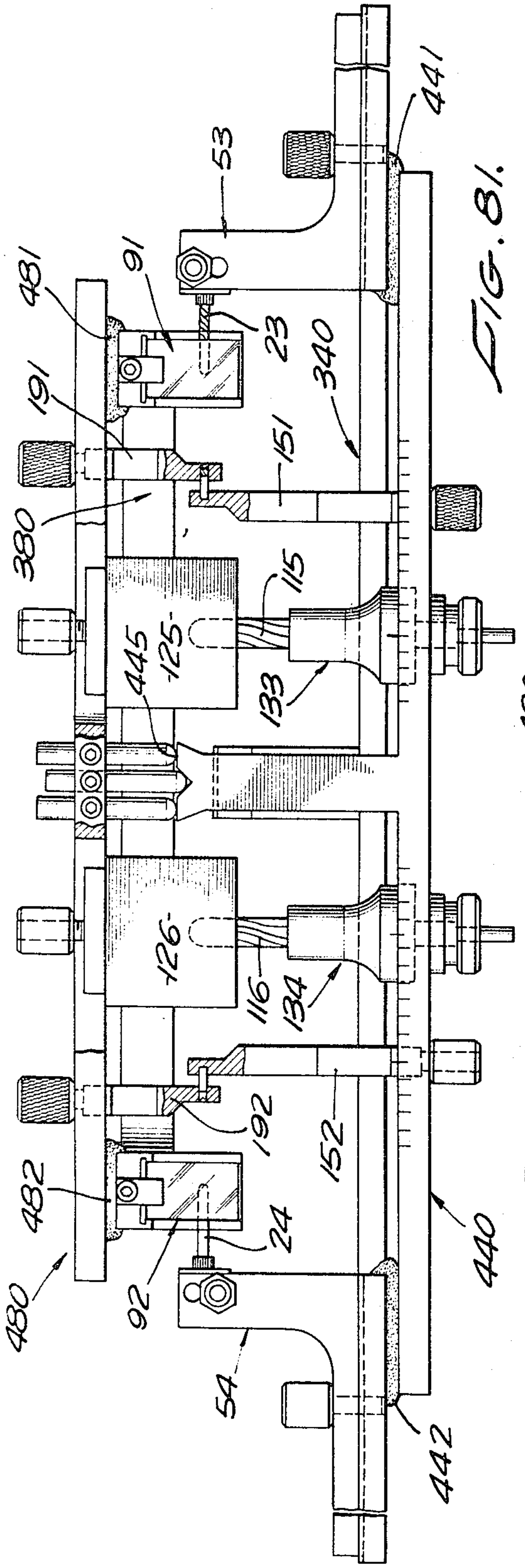
FIGURE 81 is an elevational view showing the complete assembly for the purpose of information transfer of the transfer frames and face bows of FIGURE 79.

In the principal embodiment of the invention illustrated in drawing FIGURES 5 to 69, inclusive, the record members are solid blocks of rigid plastic material, preferably fiber glass resin, and the styli are drills which are rotatably driven for cutting the plastic material. The styli at the lateral recording locations are horizontally disposed while the stylus at the frontal recording location is vertically disposed. These features are also characteristic of the preferred form of recording apparatus illustrated in FIGURES 79 to 81, inclusive.

The first, second, and third alternate forms of recording apparatus, illustrated in drawing FIGURES 70 to 78, inclusive, are apparatus which have been successfully utilized in carrying out the primary objectives and purposes of the invention, however, there are practical problems associated with each which are believed to make their usage somewhat less desirable than the preferred form of the apparatus.

*Outline of method*

In a broad sense the method of the present invention includes recording the jaw movements of the subject, transferring the recorded information into a pair of simulated eminentia, and reproducing the jaw movements in an articulator into which the simulated eminentia have been incorporated. Each of these major steps involves a number of smaller steps, however.

Thus the jaw movement recording phase requires, first, preparing the patient for the recording. Heretofore conventional procedures have generally required that clutches be prepared especially for the patient, not only for the purpose of properly fitting the tooth structures of the particular patient, but also of a disassemblable nature and which can be reassembled at a later time in their original reference position. In accordance with the method of the present invention, however, replaceable clutches are not required, and in fact the clutches preferably used are made of plastic material and are disposed of after the recording has been completed.

However, it is necessary to fit the clutches to the patient, and also to locate the hinge axis in the well known conventional manner. Thus in FIGURE 1 of the drawings the patient or subject is indicated as 10, and on the right side of his face a tattoo mark 11 has been made which indicates the location of the terminal hinge axis.

A similar tattoo mark 12 is made on the left side of the face. A tattoo mark 13 is also made in the region of the nose, in order to establish an orbital-axis reference plane.

The conventional apparatus used in establishing the terminal hinge axis is then disconnected from the clutches, and the face bows and adjustable mounting means of the present invention are attached. It is then necessary to align both the upper face bow and the lower face bow, and to firmly secure their adjustable mounting means in the selected positions of alignment, before commencing the recording. In accordance with the present invention it is greatly preferred that the recording of movements at the lateral positions, on the left and right sides of the face, be initiated in precise alignment with the extended terminal hinge axis. The requirements for the proper alignment of the upper face bow and the lower face bow are then rather severe. That is to say, the adjustable mounting means for each face bow must possess six degrees of adjustability; it must be capable of adjusting in three dimensions the position of the associated face bow, and it must also be capable of adjusting in three dimensions the angular relationship or angular position of the associated face bow. Furthermore, the achievement of a precise alignment may still be so difficult that the dentist will require the services of a very skillful assistant during this part of the procedure.

Figure 2:
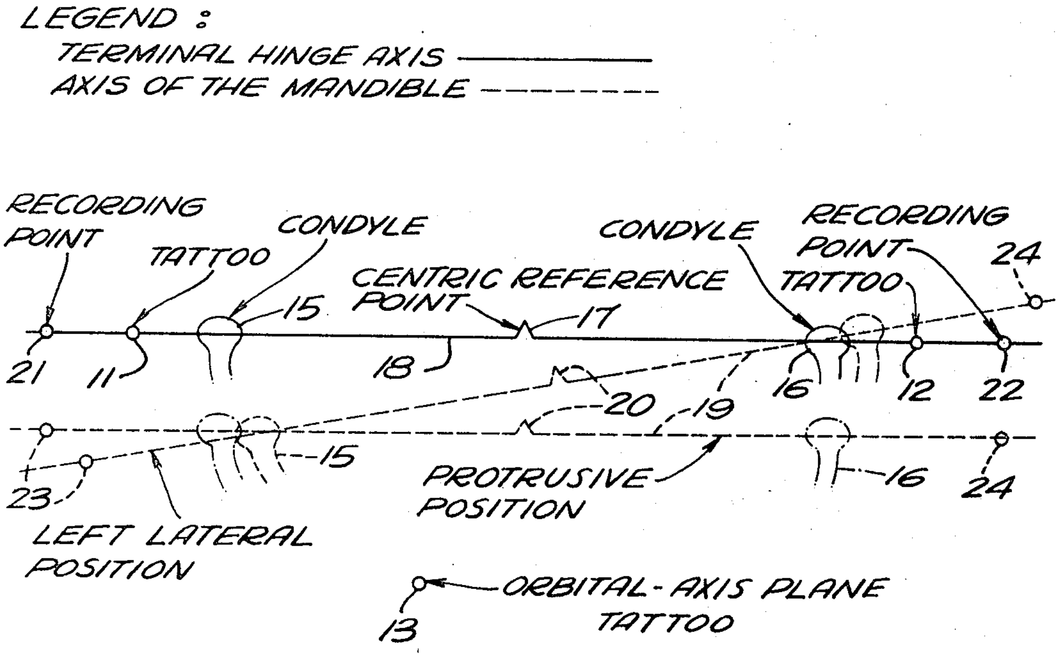
FIGURE 2 is a schematic plan view illustrating how the present invention records the relative movements between the axis of the mandible and the terminal hinge axis.

FIGURE 2 illustrates what is involved in placing the two lateral measurement transducers in precise alignment with the extended hinge axis. The right and left condyles 15 and 16 are inside the subject's head and not directly available for measurement purposes. The tattoo marks 11 and 12 on the sides of his face are, however, available. The extended terminal hinge axis is identified as 18, and the extended axis of the mandible, when not coincident with the terminal hinge axis, is designated as 19.

For purpose of initiating the recording the subject is required to place his jaws in centric, that is, the mandible is placed in its rearmost, uppermost, and midmost position. Thus the balls (condyles) of the joints are pushed tightly back into the sockets (eminentia) and the rotative axis of the mandible (otherwise separately identified as 19) coincides with the terminal hinge axis 18. Furthermore, in the centric relation the mandible is not displaced either to the left or to the right, but is in its normal, symmetrical, or midmost position. With reference to the drawing, FIGURE 2, this means that the mathematical center of the pair of condyles, which would otherwise be separately identified by the reference numeral 20, coincides with the centric reference point 17 on the terminal hinge axis.

When this centric relation is achieved the recording points 21 and 22 are selected, which lie on the extended terminal hinge axis and at equal distances from the tattoo marks 11 and 12, respectively. Each of the two laterally positioned measurement transducers is carefully located so that both elements thereof (the stylus and the record member) are measuring or observing the corresponding recording point 21 or 22. An output is derived from the transducer at this time, by causing the stylus to make an initial impression in the record member, and this initial output or initial impression thereafer represents centric.

When the mandible moves away from centric the two recording points acquire split loci, because the axis of the mandible has now become separate and distinct from the terminal hinge axis. Thus in lieu of the single recording point 21 there become two separate recording points 21 and 23, and in lieu of the single recording point 22 there become two separate recording points 22 and 24. In one of the measurement transducers one of the elements retains a fixed position representing the recording point 21, while the other element travels with and continues to represent the recording point 23. Likewise, in the other transducer one element remains fixed and represents point 22, while the other element moves with and represents the point 24.

As can be seen from FIGURE 2 a purely protrusive movement of the mandible causes the recording points 23 and 24 to be located directly in front of the recording points 21 and 22, respectively. On the other hand, a twisting movement of the jaw, which moves the mandible to the left lateral position, causes point 24 to move rearwardly and somewhat to the left of point 22, while point 23 is a great distance forwardly of point 21 and some distance to the left of it. It will be observed that despite the twisting action of the mandible the intercondylar distance between the condyles 15 and 16 remains fixed and unvarying; and it will also be noted that, in accordance with the method of the present invention, the lateral distance between the recording points 23 and 24 remains fixed and unvarying, and also remains precisely equal to the lateral distance between the recording points 21 and 22.

FIGURE 2 is, of course, a simplified representation of the jaw movement recording problem, because it presents the jaw movements only in a plane having two dimensions of movement. The movements, in actual fact, occur in three dimensions, and this is particularly true because of the curved configuration of the eminentia which forces the condyles to move downward when they move forward, and also because of the fact that disengagement of the teeth is necessary in order to move the mandible from its centric position.

Figures 3, 4:
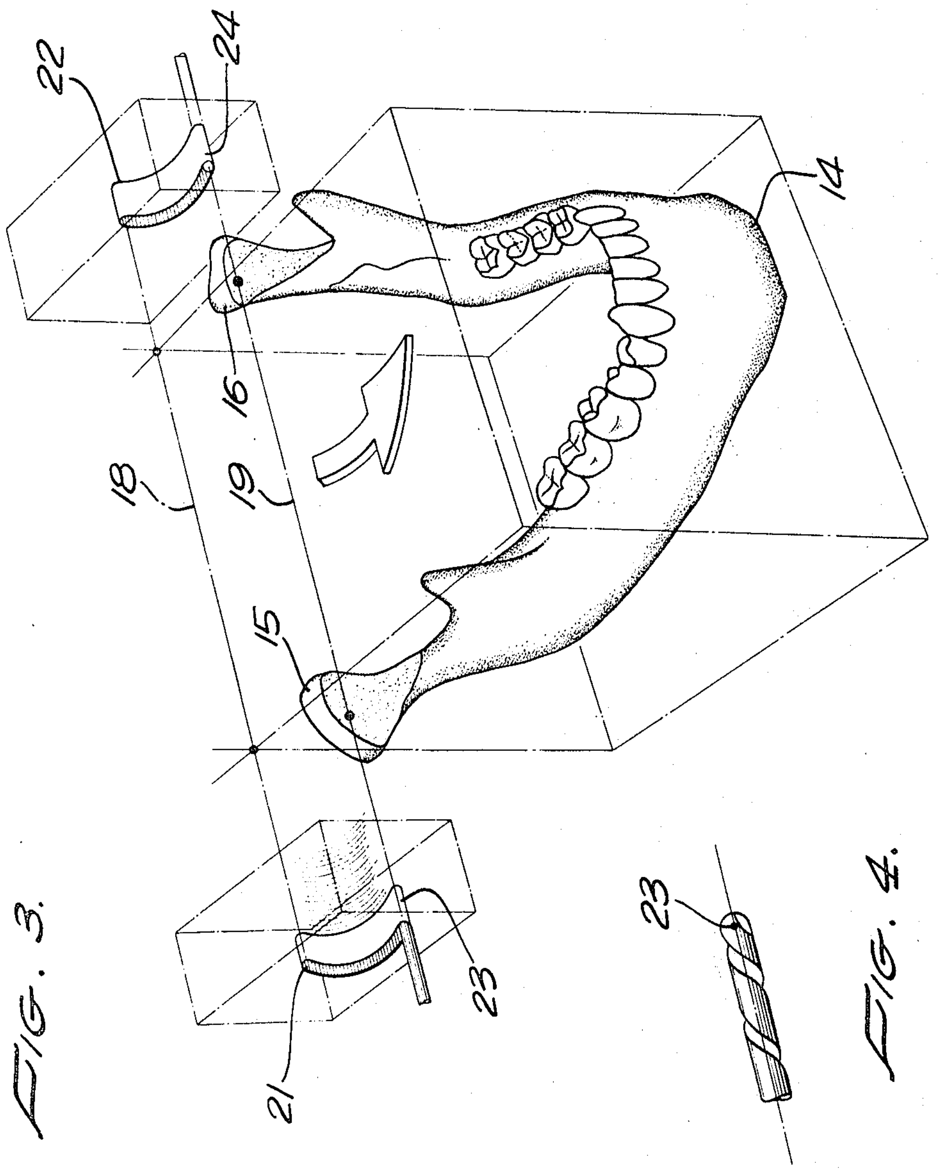
FIGURE 3 is a perspective view illustrating the recording of the protrusive movement of the mandible in accordance with the preferred form of the invention.
FIGURE 4 is a fragmentary perspective view of one of the drills utilized in FIGURE 3.

FIGURES 3 and 4 illustrates how the method of the present invention is carried out when utilizing the preferred form of recording apparatus. The mandible 14 is shown in a protrusive position so that the condyles 15 and 16 have moved forward exactly equal distances from the centric position. The axis of the mandible, identified as 19, is therefore precisely parallel to the terminal hinge axis identified as 18. Numerals 21 and 22 indicate the initial impressions formed in the right and left lateral record members, respectively, and which correspond to the centric position. Numerals 23 and 24 indicate the recording points of the horizontally disposed right and left lateral stylii which, as clearly shown in FIGURE 3, have traveled precisely the same distance as the condyles 15 and 16 from their initial reference positions. FIGURE 4 shows the cutting end of one of the drills. The curved configuration of the openings cut in the lateral record members results from the curved configuration of the undersurface of the eminentia, as previously described.

The upper face bow is also used to record the point 13.

After the jaw movements have been recorded the face bows are detached from their respective mounting means, and are removed from the subject's face. The face bows are, at this time, preferably kept attached to each other, the attachment being achieved by the interengagement of the stylii and record members of the measurement transducers. After the face bows have been removed the clutches are also removed, and as previously mentioned are disposed of. The adjustable mounting means for the two face bows are then stored away for use on a later occasion.

The next part of the procedure is preparing for information transfer. Each of the upper and lower transfer frames is so constructed as to contain an assumed terminal hinge axis line, and also to contain a centric reference indicating means. The two transfer frames are placed in a generally parallel relationship, and are vertically moved so that their terminal hinge axis reference lines coincide, before being secured together on the axis. They are, at the same time, moved laterally so as to obtain coincidence of their respective centric reference indicators (one of which may be considered as representing the point 17 and the other as representing the point 20). The transfer frames are then ready for attachment of the face bows thereto.

Each of the face bows is then attached to its corresponding transfer frame in such a position relative thereto that the terminal hinge axis reference line of the face bow coincides with that of the transfer frame to which it is being attached. This may be best understood by considering the corollary arrangement, that is, the face bows during recording were aligned (through their motion transducers) to the terminal hinge axis of the patient or subject; the subject has been removed and has been replaced with the transfer frames which represent his upper and lower jaws, respectively; and it is therefore necessary to align the hinge axis reference lines of the transfer frames with the hinge axis reference lines of the face bows. When this condition has been achieved the face bows in conjunction with the transfer frames are all referenced to a single line which represents the terminal hinge axis of all four of these elements or structures. This condition is the precise equivalent of the initial alignment that was achieved between the face bows, and the upper and lower jaws of the subject, prior to the commencement of recording.

Thereafter a pair of blank records are attached to the upper transfer frame, which are adapted to be formed into simulated eminentia, and a pair of condyle drills are attached to the lower transfer frame. After a proper interengagement between the condyle drills and the record blanks, the drills are drivingly rotated and the upper and lower transfer frames are manipulated so as to reproduce, at the simulated joint locations, the original three-dimensional movement of the jaws of the subject. Thus, the information stored in the recordings of the motion transducers is played back, and precisely the same information which originally flowed from the real joints of the subject into the recording devices now flows in the reverse direction and is incorporated into the simulated joints as they are formed.

While it is here stated that, in the simulated joints, the blank records are used to form simulated eminentia, it would also be possible to use preformed eminentia of a predetermined configuration and form a pair of condyles which would then store all of the movement information. Alternatively, it would be possible to use a preformed eminentia in one joint, and a preformed condyle in the other joint, and form the remaining two members for accepting the movement information. The reason that preformed condyles are utilized in the apparatus herein illustrated, while forming simulated eminentia, is that the results have been proven to be perfectly satisfactory, and this particular procedure is more in conformance with custom and tradition than would be the other procedure of forming simulated condyles.

After the simulated eminentia have been formed the face bows and transfer frames are no longer needed. The upper transfer frame and the simulated eminentia are so constructed that they are coupled together in a predetermined relative position, with a predetermined lateral spacing between the eminentia holders. The articulator upper frame is constructed in a manner generally similar to that of the upper transfer frame, and the simulated eminentia holders when transferred to and attached to the articulator upper frame occupy the same predetermined relationship to it that they had previously occupied relative to the upper transfer frame. Models of the patient's upper and lower tooth structures are attached to the upper and lower articulator frames, respectively, and the conventional simulated condyle balls of the lower part of the articulator in conjunction with the simulated eminentia attached to the articulator upper frame are utilized for reproducing the jaw movements of the subject and manipulating the simulated tooth structures in accordance therewith. The remaining procedures are conventional in the field of dentistry and require no further description here.

*Principal embodiment*

The structure of the lower face bow assembly as used during jaw movement recording will first be described.

Figures 52, 54:
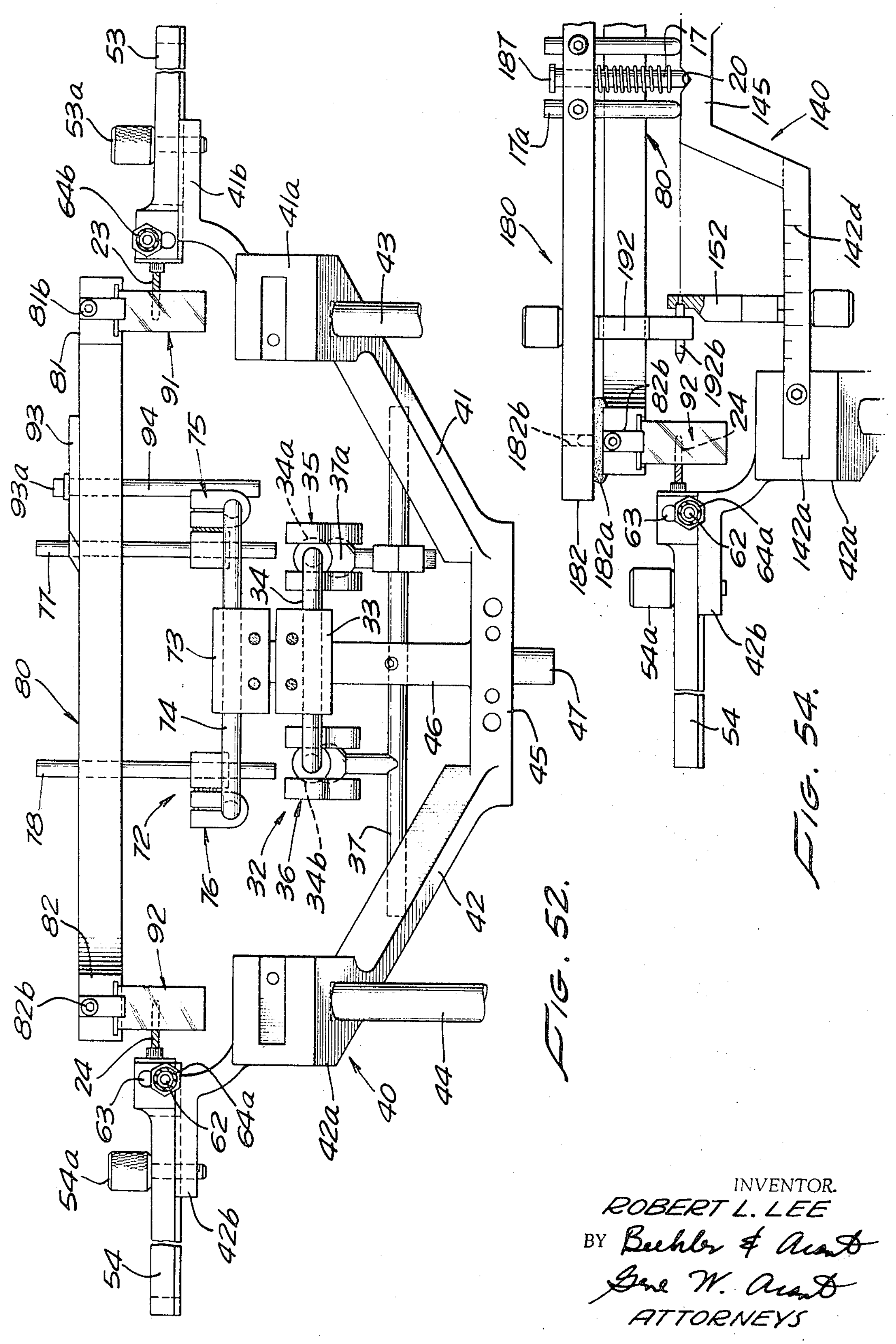
FIGURE 52 is a rear elevational view of the upper and lower face bows and their associated apparatus after recording has been completed and they have been removed from the patient.
FIGURE 54 is a rear elevational view of the left lateral recording location taken after the lower transfer frame has been attached to the lower face bow, the upper transfer frame has been aligned with the lower transfer frame, and the upper transfer frame has been attached to the record members by means of the plastic attachment pads.

The lower clutch 31 shown in FIGURE 5 is adapted to be secured to the lower tooth structure of the subject, in a fixed position relative thereto, as is conventional. The adjustable mounting means for the lower face bow is a fairly complex assembly identified by the reference numeral 32, being shown in a side view in FIGURE 50 and a perspective view in FIGURE 51. A rear elevational view of this assembly is seen in FIGURE 52. As best shown in FIGURE 5 and FIGURES 12 to 17, this assembly includes a lower vise grip 33 which is connected to the lower clutch 31, and a U-bolt 34 which is supported by vise grip 33. Adjustable brackets 35, 36, are carried on respective ends 34*a*, 34*b* of the U-bolt. Another part of the lower mounting means is a horizontal shaft 37 which appears in FIGURES 18 and 20, and which passes through an opening in the forward stem portion of the lower face bow. Shaft 37 carries a movable sphere 37*a* and a fixed sphere 37*b*. The ends of bracket 35 receive the spheres 34*a* and 37*a*, while the ends of bracket 36 receive the spheres 34*b* and 37*b*. Since these spheres are longitudinally slidable in the brackets (see FIGURE 17) the lower mounting means is not only capable of adjusting the position of the lower face bow in three dimensions, but is also capable of adjusting its angular relationship in three dimensions.

Figure 18:
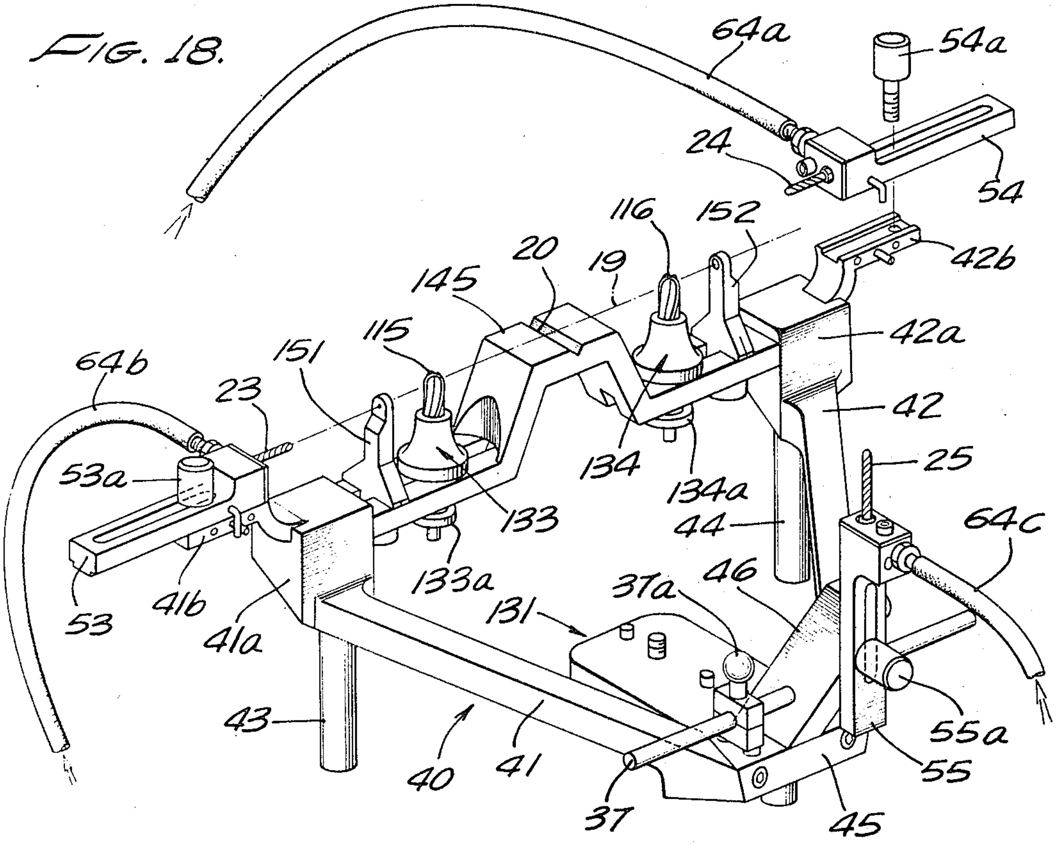
FIGURE 18 is a front perspective view, partially exploded, of the lower face bow with the lower transfer frame, mounting plate, and legs attached.
Figure 20:
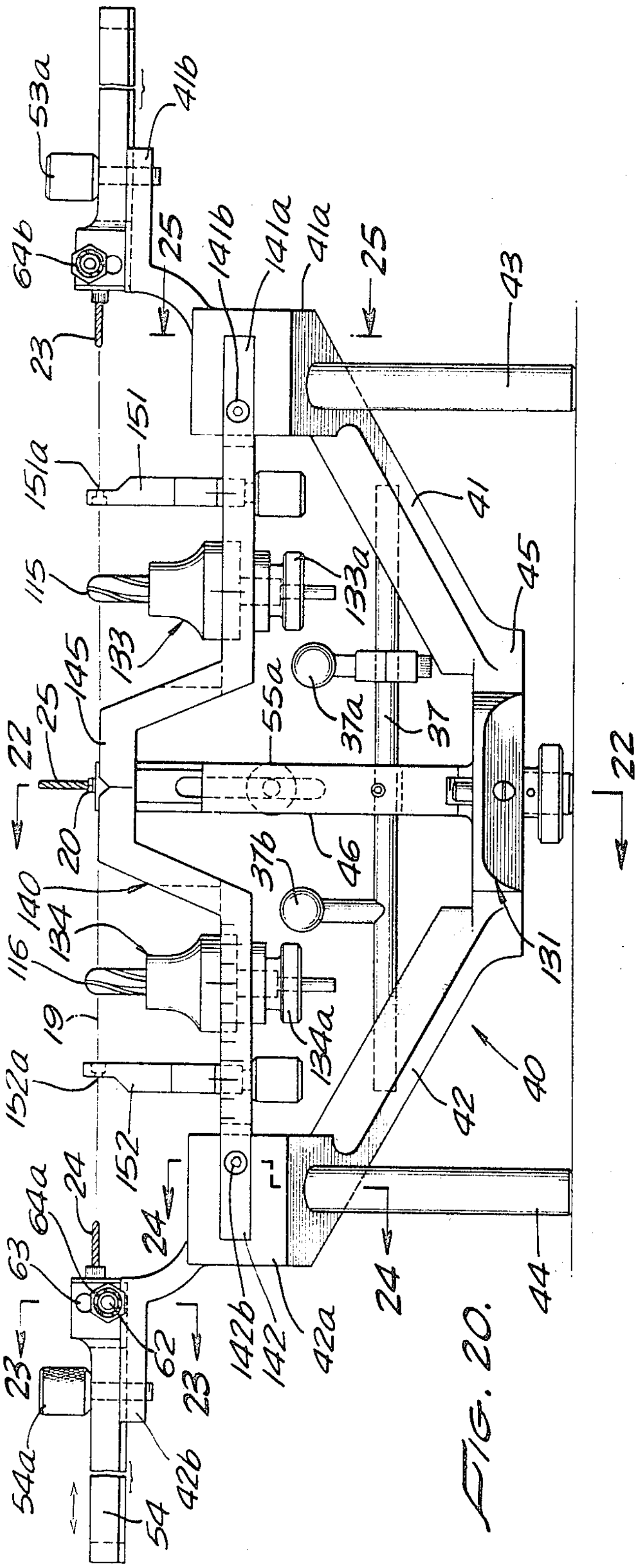
FIGURE 20 is a rear elevational view of the lower face bow assembly of FIGURE 18.
Figure 25:
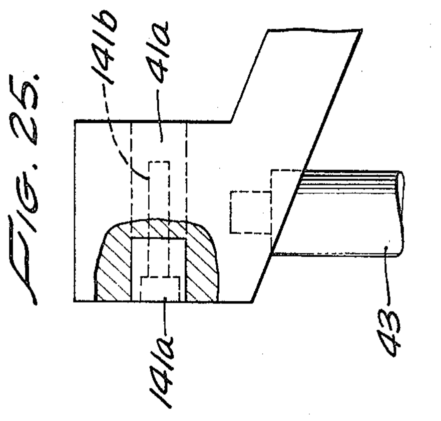
FIGURE 25 is a cross-sectional view taken on the line 25—25 of FIGURE 20.
Figure 24:
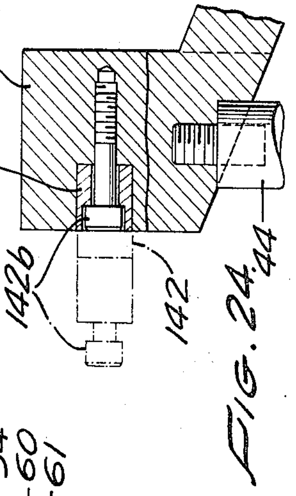
FIGURE 24 is a cross-sectional view taken on the line 24—24 of FIGURE 20.
Figures 21, 22, 26, 27:
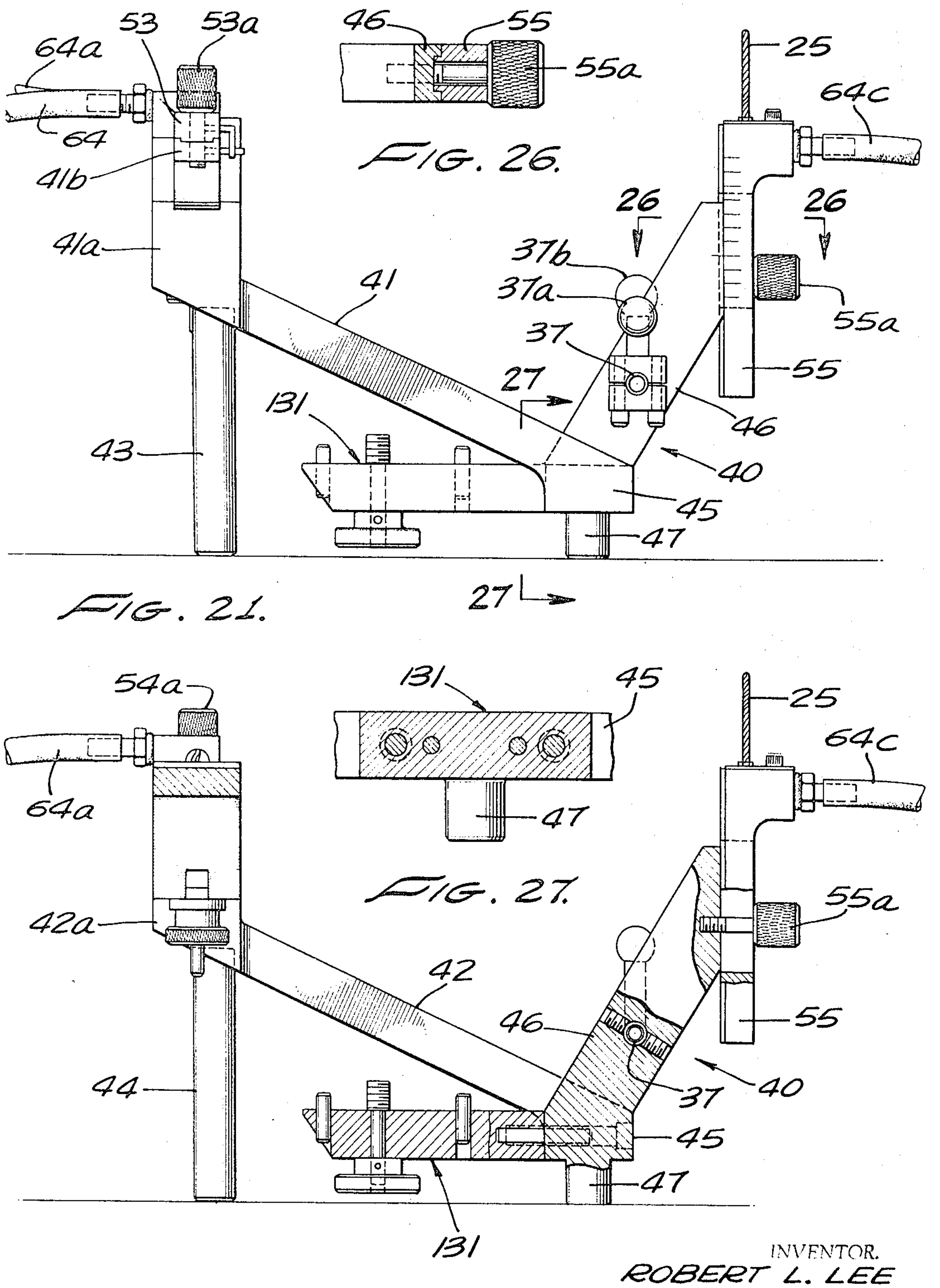
FIGURE 21 is a side elevational view of the assembly of FIGURE 20.
FIGURE 22 is a cross-sectional view taken on the line 22—22 of FIGURE 20.
FIGURE 26 is a cross-sectional view taken on the line 26—26 of FIGURE 21.
FIGURE 27 is a cross-sectional view taken on the line 27—27 of FIGURE 21.

The lower face bow is generally identified as 40, and its general arrangement is perhaps best illustrated in FIGURE 18 but is also shown in FIGURES 20, 21, and 22. In essence the lower face bow is a generally horseshoe-shaped device which is adapted to receive the shaft 37 of the lower mounting means, and which is also adapted to support three stylus carriages. The right lateral carriage is identified as 53 and carries the right lateral recording drill or stylus 23; the left lateral carriage identified as 54 carries the left lateral drill 24; and the frontal carriage 55 supports the frontal drill 25. As previously explained in conjunction with FIGURE 3 the lateral recording styli are primarily of significance because of the loci of their recording points, which are the radius centers of the respective hemispherical ends of the styli, and although in conjunction with FIGURE 3 the numerals 23 and 24 were utilized to identify these recording points, the same numerals will hereinafter for simplicity be used in referring to each of the styli as an entity.

More specifically, as clearly seen in FIGURES 18 and 20 the lateral carriages 53 and 54 are supported for slidable movement so that the lateral separation between the drills 23 and 24 may be varied, and the lateral position of each drill may be varied with respect to the lateral center of the instrument, while at the same time maintaining the mutual alignment of the longitudinal axes of these drills. The common axis of these drills corresponds to the axis of the mandible, and is therefore, in FIGURES 18 and 20 identified by the numeral 19.

As seen in FIGURES 18, 21 and 22 the frontal carriage 55 is slidable in a vertical direction, for positioning its associated drill 25. Each of the carriages has a fastening screw for securing it in a selected position of adjustment, the fastening screws being identified as 53*a*, 54*a*, and 55*a*, respectively.

Figure 19:
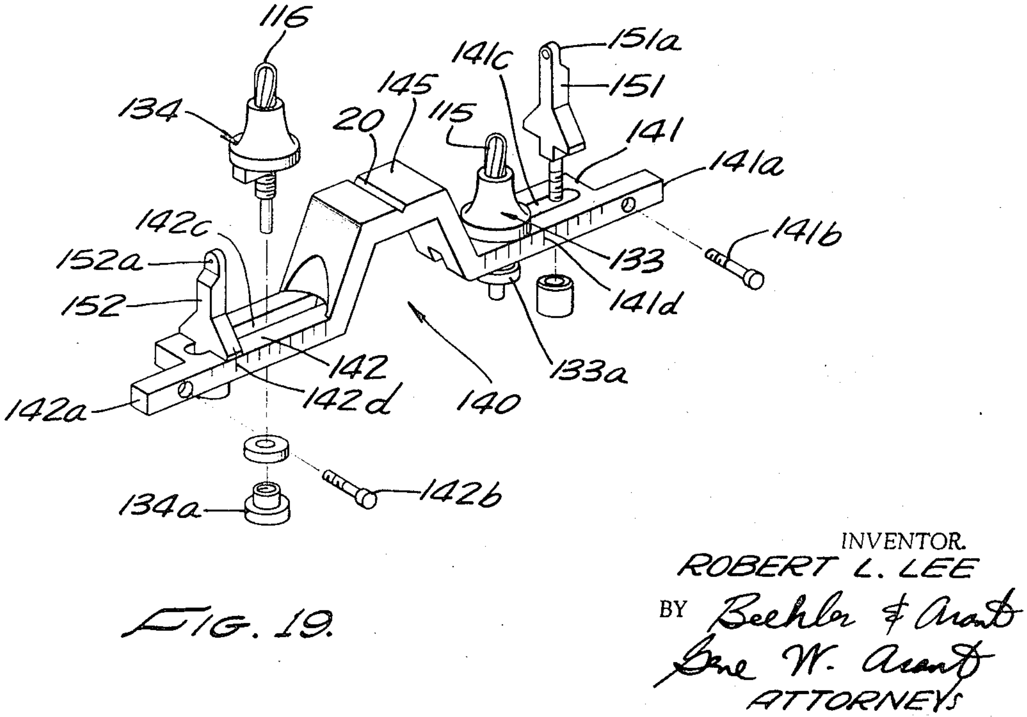
FIGURE 19 is a rear exploded perspective view of the lower transfer frame and associated parts.
Figures 50, 51:
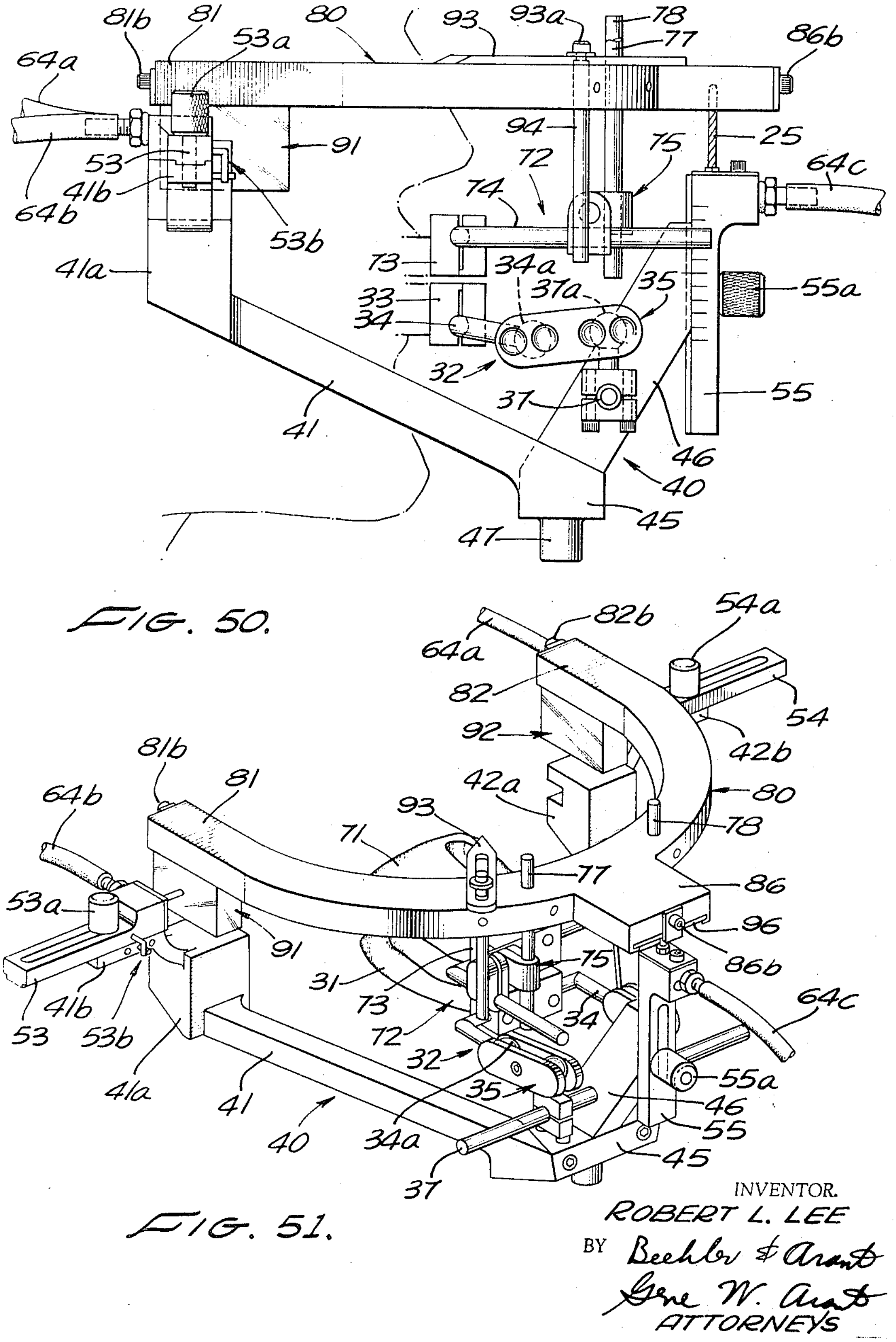
FIGURE 50 is a side elevational view of the upper and lower face bows, and associated apparatus, during the actual recording of jaw movements of the patient.
FIGURE 51 is a front perspective view of the upper and lower face bows during recording.

In order to avoid confusion it must here be pointed out that in FIGURES 18 and 20 to 22 the lower face bow 40 is shown only with the lower transfer frame 140 attached to it. However, as seen in FIGURE 19 the lower transfer frame 140 is a separate structural element which can be detached from the lower face bow. And of course the lower transfer frame is not used during recording, because the lower face bow 40 must then encircle the lower jaw of the patient or subject, as shown in FIGURES 50 and 51.

More specifically, the lower face bow 40 includes a right frame member 41 having a rear corner portion 41*a* and a right wing portion 41*b*. A removable right rear leg 43 is attached to the corner portion 41*a*. The lower face bow also includes a left frame member 42 having a left rear corner piece 42*a* and left wing portion 42*b*. A left rear leg 44 is removably attached to the corner portion 42*a*. The lower face bow 40 also includes a forward central frame portion 45 which interconnects the frame side members 41 and 42 to form an integral structure therewith. A vertical stem 46 rises up from the frame portion 45, and it is this stem which receives the shaft 37 of the mounting means, and upon which the forward carriage 55 is also supported.

Figure 23:
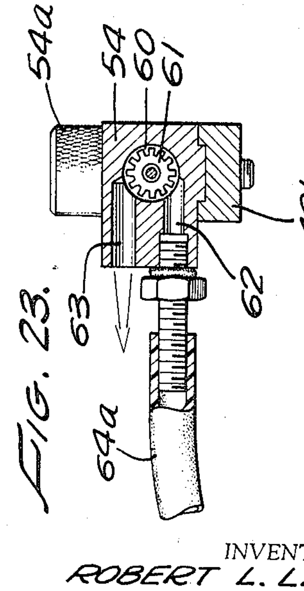
FIGURE 23 is a cross-sectional view taken on the line 23—23 of FIGURE 20.

A typical drive arrangement for one of the drills is shown in FIGURE 23, which also illustrates the slidable arrangement of the carriage 54 on the lower face bow wing portion 42*b*. Carriage 54 has a chamber 60 formed therein, in which an air turbine 61 is disposed. An inlet opening 62 brings pressurized air into the chamber 60, while the used or spent air is exhausted to atmosphere through a relief opening 63. A flexible air hose 64 is coupled to the inlet opening 62 for supplying pressurized air thereto.

The upper face bow, together with its mounting means and clutch, as used during jaw movement recording, will now be described.

As shown in FIGURE 5 the upper clutch 71 is adapted for securement to the upper tooth structure of the patient, to move therewith, in a conventional manner. The upper mounting means, generally designated as 72, includes a vise grip 73 which is attached to the upper clutch 71. An upper U-bolt 74 is carried by the vise grip 73. A pair of universal joints 75 and 76 are carried on the outer ends of the U-bolt 74, and the complete structure of universal joint 75 is shown in perspective in FIGURE 11. Various structural details of the vise grip, U-bolt, and universal joints are shown in FIGURES 6 to 10, inclusive.

Figures 32, 33, 34:
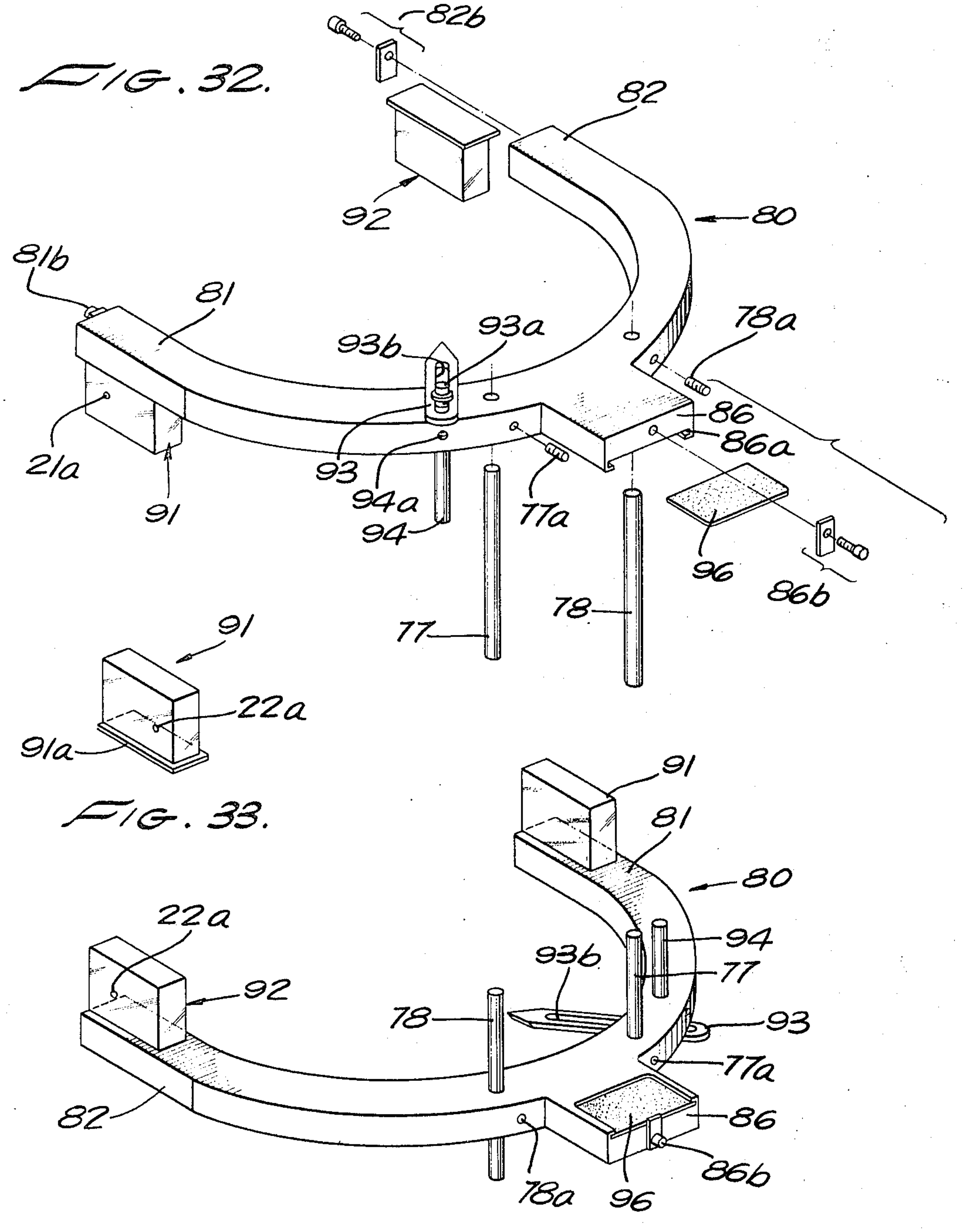
FIGURE 32 is a partially exploded front perspective view of the upped face bow assembly.
FIGURE 33 is a perspective view of one of the lateral record members.
FIGURE 34 is a perspective underneath view of the upper face bow assembly.

The upper face bow 80 is shown in FIGURE 32, together with vertical posts 77 and 78 which constitute the remaining portions of the upper mounting means. The lower ends of posts 77 and 78 are received in the universal joints 75 and 76, respectively, as may best be seen in FIGURES 50 and 51. The upper ends of these posts are received in openings in the upper face bow, and are secured therein by set screws 77*a*, 78*a*, illustrated in FIGURE 32. It is possible to adjust the angular position of the U-bolt 74, to adjust the angular relationship in three dimensions of each of the posts 77 and 78 relative to its associated end of the U-bolt by means of the respective universal joint, and also to vary the points of securement of both the upper and lower ends of the posts 77 and 78. Consequently the upper mounting means, like the lower mounting means, has six degrees of freedom, and is capable of positioning the upper face bow in any desired position and at any desired angle.

The structure of the upper face bow 80 and its associated apparatus is shown in FIGURES 32 to 41, inclusive. The upper face bow is a flat rigid member of substantially uniform vertical thickness and of horseshoe-shaped configuration in the horizontal plane. At its center it has a forward protrusion identified as 86, and the right lateral extremity is designated 81 while the left lateral extremity is designated as 82. A set of three record members 91, 92, 96 are removably attached beneath the face bow portions 81, 82, 86, respectively.

Referring to FIGURES 32 and 33, the record member 96 is a flat rigid wafer of plastic material having a generally rectangular configuration. The undersurface of face bow portion 86 is provided with a guideway 86*a* having flanged edges within which the recording wafer 96 may be slidably received. The wafer is then held in place by means of a keeper 86*b* consisting of a small holding plate and a retaining screw. The wafer 96 is adapted to be engaged by the drill 25 for recording movement in two dimensions only.

The record members 91 and 92 are identical, and each consists of a rigid block of plastic material of generally rectangular configuration, the plastic material being preferably fiber glass resin. The height of the block is substantially greater than its lateral thickness, and its length dimension measured in a direction from front to rear of the face of the subject is substantially greater than its height. On its longitudinal upper edges the block 91 has a pair of longitudinal flanges 91*a* formed thereon, which are preferably an integral part of the block, although if desired the flanges may be formed by utilizing a separate plate whose lateral dimension is greater than the lateral thickness of the block and then securing the block to its undersurface. The corresponding flanged edges of block 92 are identified as 92*a*. Each of the face bow portions 81, 82 has a guideway formed on its undersurface, generally similar to the guideway 86*a*, and into which the corresponding record members 91, 92 may be slidably inserted from the rear thereof, being retained by their flanged edges. Keepers 81*b*, 82*b* are also provided for securing the blocks 91, 92 in place.

Figure 35:
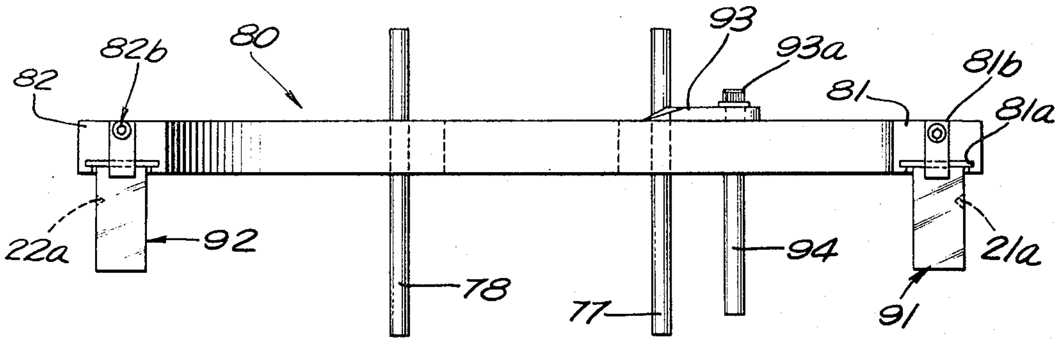
FIGURE 35 is a rear elevational view of the upper face bow assembly.
Figures 36, 39:
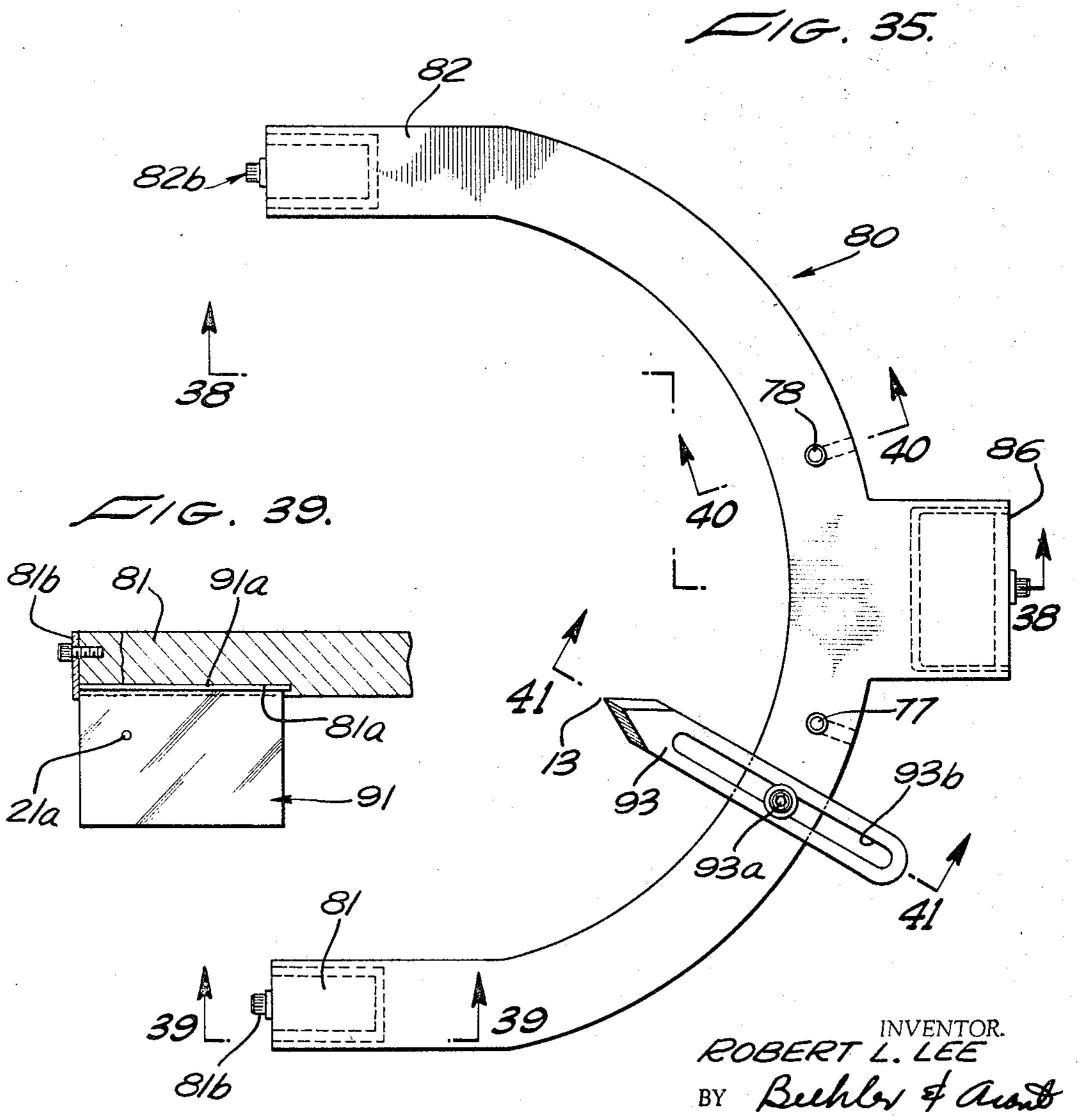
FIGURE 36 is a top plan view of the upper face bow assembly.
FIGURE 39 is a side elevational view of one of the lateral record members taken on the line 39—39 of FIGURE 36.
Figure 37:
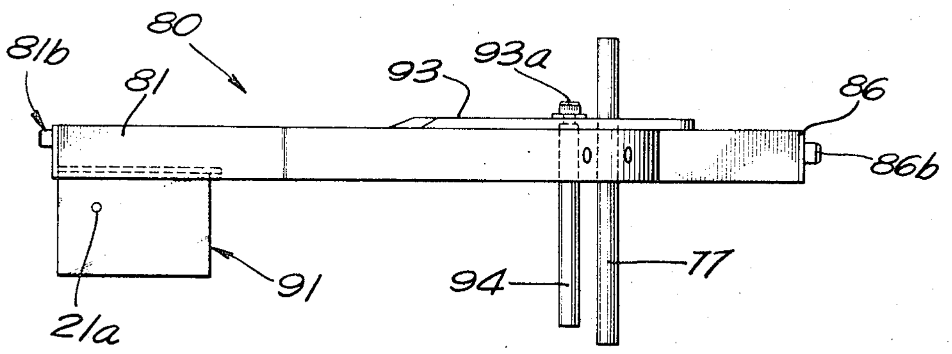
FIGURE 37 is a side elevational view of the upper face bow assembly.
Figure 38:
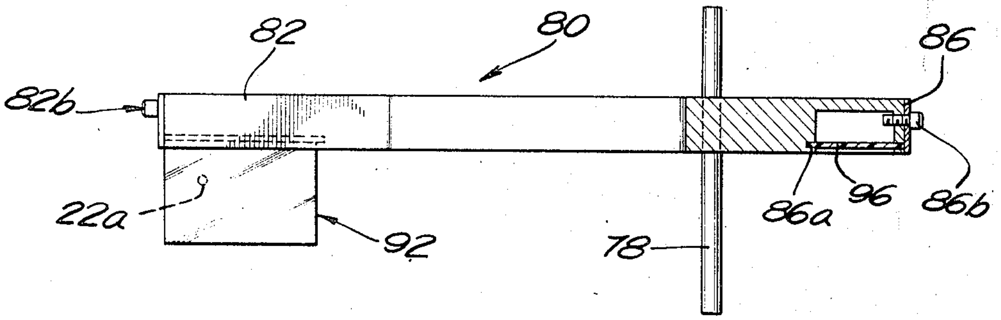
FIGURE 38 is a cross-sectional view of the upper face bow assembly taken on the line 38—38 of FIGURE 36.
Figures 40, 41:
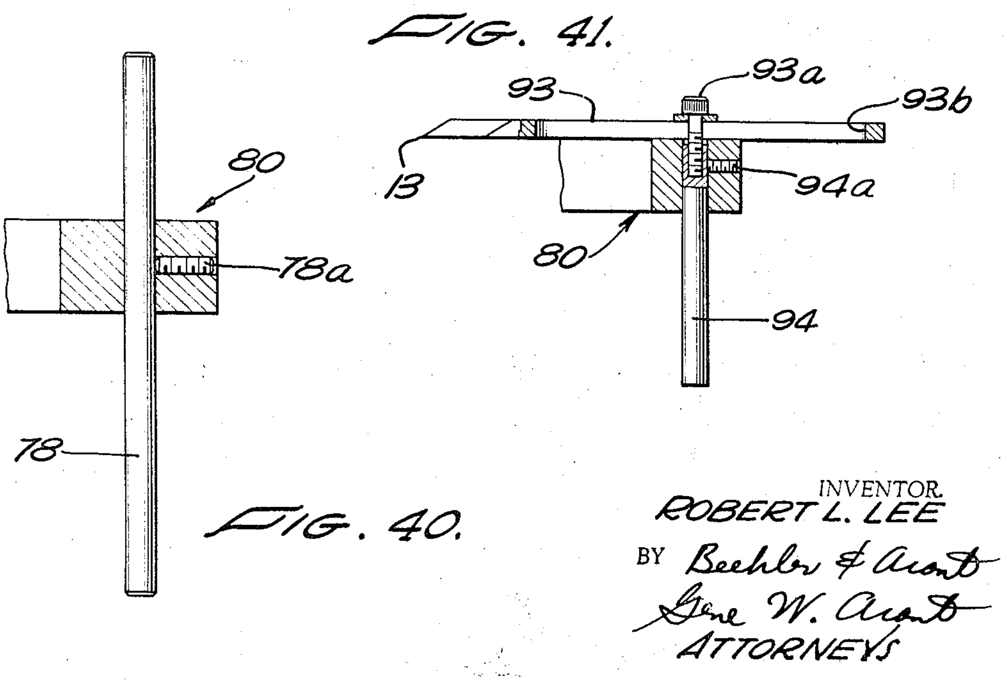
FIGURE 40 is a cross-sectional view taken on the line 40—40 of FIGURE 36.
FIGURE 41 is a cross-sectional view taken on the line 41—41 of FIGURE 36.

A useful feature of the record members 91, 92 is the small dimple or depression in the outside lateral surface thereof which provides a centric reference point. The centric dimple is located somewhat above the precise center of the laterally outward surface of the block, and also somewhat to the rear thereof. As seen in FIGURE 35 the dimple in block 91 is designated 21*a*, while the dimple in block 92 is designated 22*a*. It will be understood that the dimples 21*a* and 22*a* correspond at least approximately to the recording points 21 and 22 illustrated in FIGURE 2.

Another part of the upper face bow assembly is the orbital-axis plane locating device 93. The pointer 93 is secured by a set screw 93*a* which passes through an elongated slot 93*b* of the pointer. The set screw 93*a* is in turn received in a threaded opening in the upper end of the post 94, which is rotatably disposed in a vertical opening in the face bow 80 somewhat to the right of the forward recording location 86. A set screw 94*a* in the front wall of the face bow secures post 94 against undesired rotation. Both the angular position and the length of the pointer 93 may therefore be adjusted, so that its point 13 can be precisely set on the tattoo mark 13 of the subject's face. It is therefore seen how all of the reference points 11, 12 and 13 illustrated in FIGURES 1 and 2 are transferred to the upper face bow either prior to or during the recording operation. The points 11 and 12 are not transferred directly, but through the transfer of the points 21 and 22.

Figure 42:
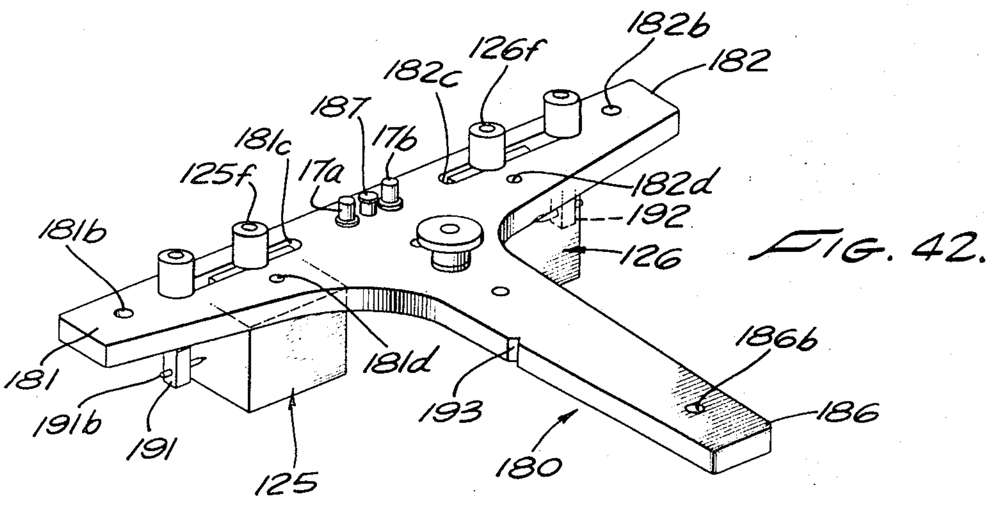
FIGURE 42 is a top front perspective view of the upper transfer frame assembly.
Figure 43:
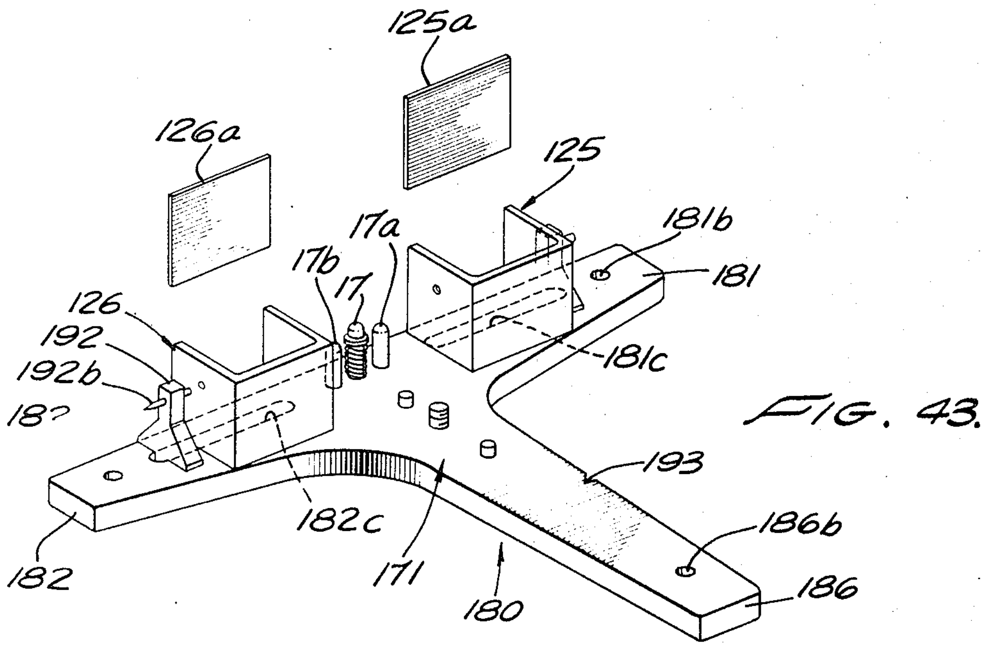
FIGURE 43 is a bottom front perspective view, partially exploded, of the upper transfer frame.

The transfer apparatus includes, in general, an upper transfer frame and a lower transfer frame, means for aligning the transfer frames to each other and to the face bows, a pair of blank simulated eminentia, and a pair of condyle drills. Upper transfer frame 180 is shown in FIGURES 42 and 43 while lower transfer frame 140 is shown in FIGURES 18 to 20. In aligning the frames the lower transfer frame is first aligned with and attached to the lower face bow. Therefore, the lower transfer frame will be described first.

Lower transfer frame 10 has a right lateral end 141 with wing 141*a* formed thereon, and a left lateral end 142 with wing 142*a* formed thereon. In its longitudinal center the lower transfer frame has an upstanding portion 145 whose upper surface is flat, and which defines the axis of the mandible 19 insofar as the lower transfer frame is concerned. In its lateral center, in the surface portion 145, the lower transfer frame has a transverse groove 20, which corresponds to the centric reference point 20 of FIGURE 2.

The lower transfer frame is attached to the lower face bow by means of the wings 141*a*, 142*a*, which are fastened to the corner portions 41*a*, 42*a*, respectively, by means of fastening screws 141*b*, 142*b*. When the lower transfer frame 140 and the lower face bow 40 are thus secured together their reference axes coincide, as shown in FIGURES 18 and 20, and this reference becomes the axis of the mandible 19.

Figure 45:
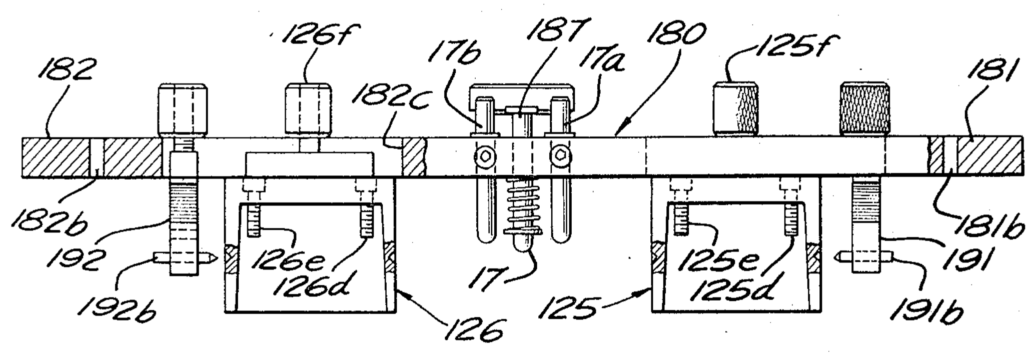
FIGURE 45 is a rear elevational view, partially in section, of the upped transfer frame assembly.
Figures 46, 47, 48:
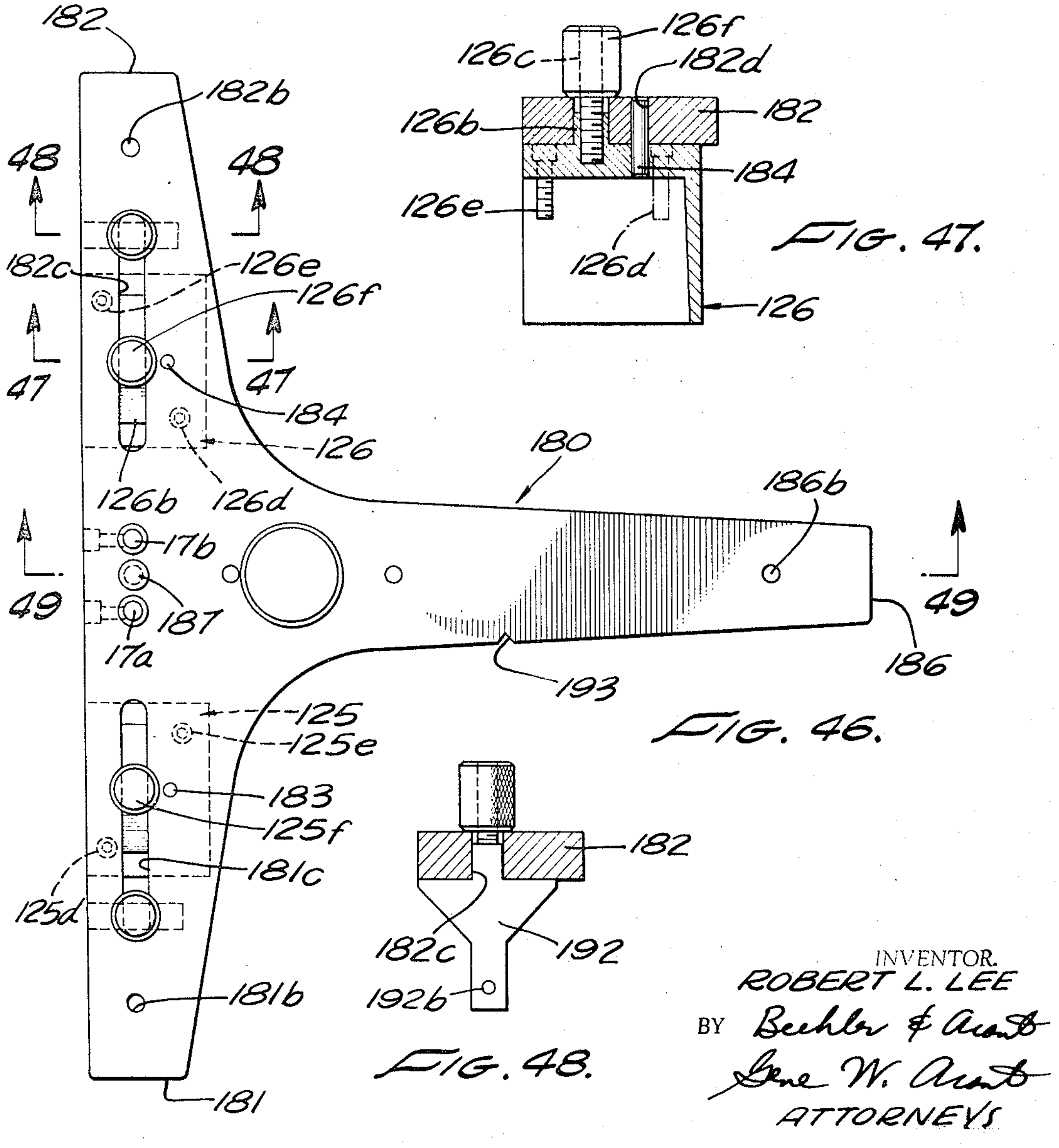
FIGURE 46 is a top plan view of the upper transfer frame.
FIGURE 47 is a cross-sectional view taken on the line 47—47 of FIGURE 46.
FIGURE 48 is a cross-sectional view taken on the line 48—48 of FIGURE 46.

The upper transfer frame 180 is a T-shaped frame whose lateral arms provide a right lateral extremity 181 and left lateral extremity 182. The forward portion of the frame, at the bottom of the T, is designated 186. At the juncture of the lateral arms of the upper transfer frame, and at the precise lateral center of this member, there is an opening in which a vertical pin 187 is slidably received. The pin extends downward below the transfer frame, as seen in FIGURES 43 and 45, and the lower end of the pin is designated as 17 to correspond with the centric reference point 17 of FIGURE 2. Pin 187 is spring-loaded so that its lower end is movable vertically relative to the upper transfer frame. The upper transfer frame also has openings 181*b*, 182*b*, and 186*b* formed therein, for purpose of its attachment to the upper face bow by means of plastic attachment pads, as subsequently described.

Figure 28:
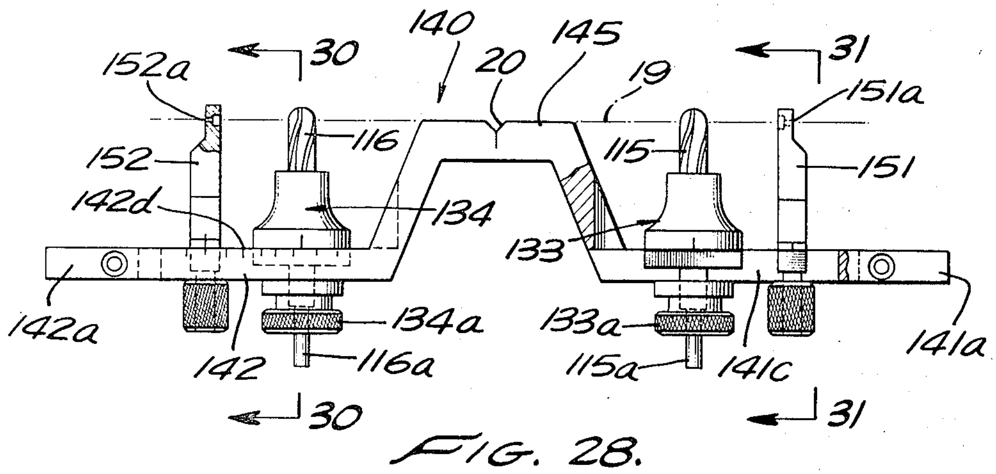
FIGURE 28 is a rear elevational view, partially in cross section, of the lower transfer frame, with the calibrations not being shown.
Figure 29:
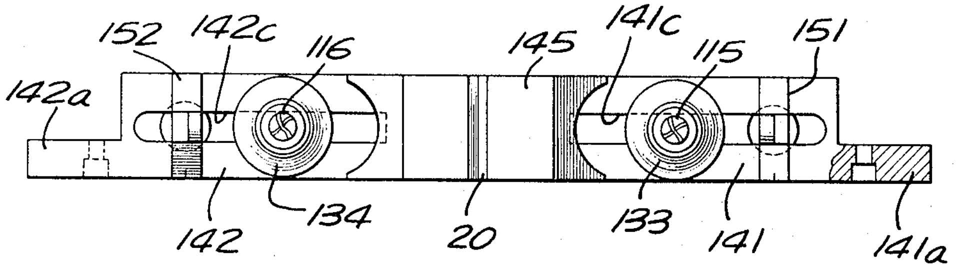
FIGURE 29 is a top plan view of the lower transfer frame.

After the lower transfer frame is attached to the lower face bow, the upper and lower transfer frames are aligned and attached to each other. Therefore, the means for aligning the two transfer frames to each other will now be described. The lower transfer frame has slideways 141*c*, 142*c* formed in the respective lateral ends thereof. A lower pair of axis alignment posts 151, 152 are adapted to be received in respective ones of these slideways. The lower alignment posts have openings 151*a*, 152*a* formed in their respective upper ends, and providing alignment reference means. The vertical height of these lower alignment posts is such that the openings in their upper ends are precisely aligned with the upper surface of the frame portion 145, and hence with the axis of the mandible 19. The relationship is shown in FIGURES 18 and 28. It will be noted that the lower alignment posts may be moved or adjusted laterally of the lower transfer frame, in their respective slideways, and secured in any desired position by the corresponding fastening nuts.

Figures 49, 53, 57, 58:
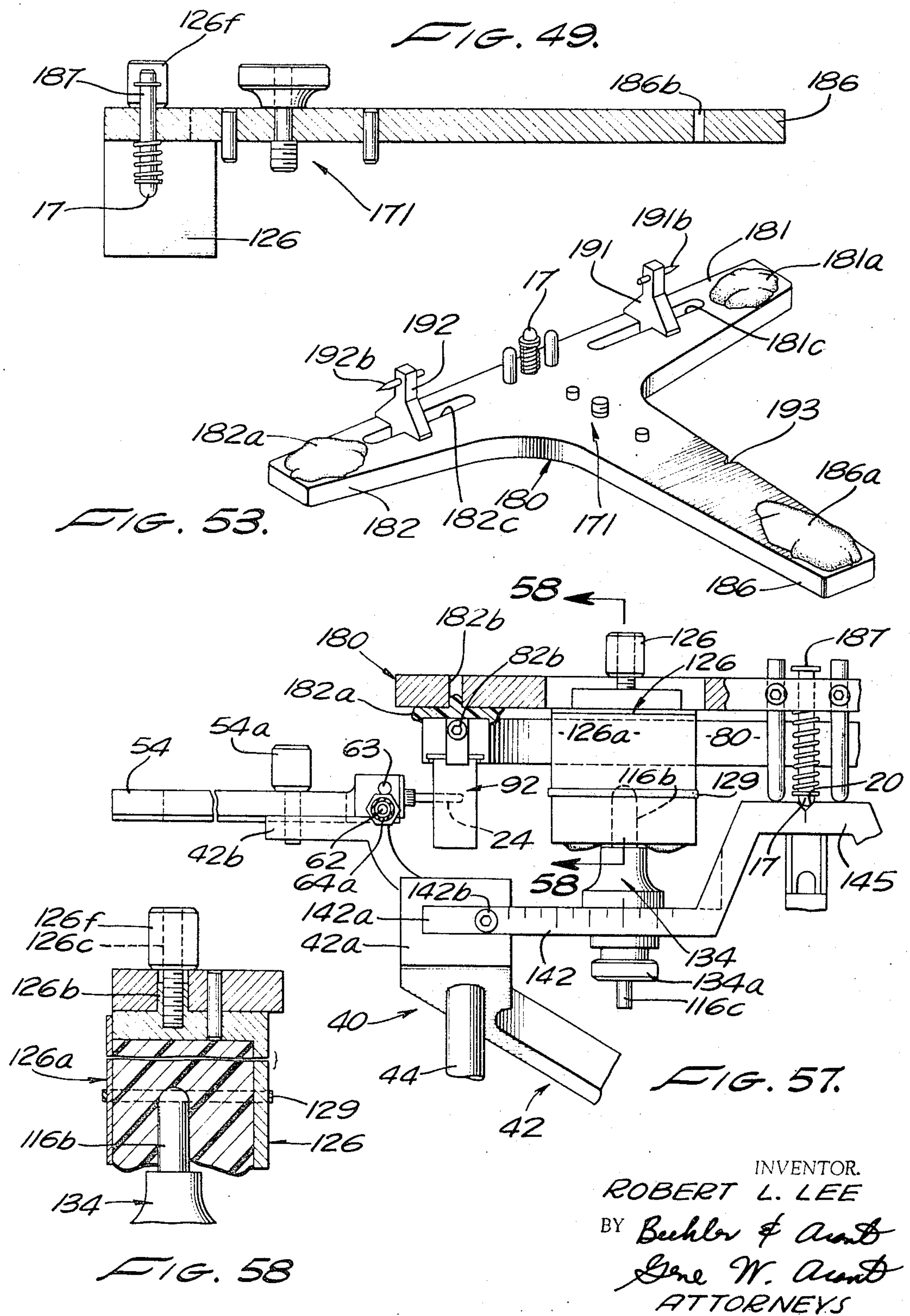
FIGURE 49 is a cross-sectional view taken on the line 49—49 of FIGURE 46.
FIGURE 53 is an underneath perspective view of the upper transfer frame with plastic attachment pads in place.
FIGURE 57 is a rear elevational view of the left lateral portion of the upper face bow and upper transfer frame after they have been rejoined to the lower face bow and lower transfer frame, and showing the forming of the centric opening in the simulated left lateral eminentia.
FIGURE 58 is a cross-sectional view taken on the line 58—58 of FIGURE 57.

An upper pair of axis alignment posts 191, 192 are adapted for attachment to the upper transfer frame, and are generally similar both in their srtucture and operation to the lower pair of alignment posts. The upper transfer frame has slideways 181*c*, 182*c* formed in its lateral arms, which are generally similar to the slideways 141*c*, 142*c* of the lower transfer frame. The initial attachment of the upper pair of axis alignment posts to the upper transfer frame 180 is shown in FIGURE 53.

A pair of axis alignment pins 191*b*, 192*b* are also utilized in aligning and attaching the upper and lower transfer frames. Pin 191*b* is inserted into the reference openings of the upper post 191 and the lower post 151, while the pin 192*b* is inserted into the reference openings of upper post 192 and lower post 152. This relationship is shown in FIGURE 54.

The condyle drills 115, 116 are also part of the transfer apparatus. Drawing FIGURES 18 to 20 and 28 appear to indicate that the condyle drills are utilized at the same time as, and in conjunction with, the lower pair of axis alignment posts 151, 152. In actual fact, however, the alignment posts are utilized only during the alignment of the frames, and are then detached, and the condyle drills are subsequently attached to the lower transfer frame 140 preparatory to forming the simulated eminentia.

The eminentia boxes 125, 126 are another part of the transfer apparatus. Drawing FIGURES 42, 43, 45, and 46 appear to indicate that the eminentia boxes are utilized in conjunction with the upper pair of axis alignment posts. The fact is, however, that the alignment posts are utilized only during alignment of the frames, and are then detached, and the eminentia boxes are subsequently attached to the upper transfer frame 180 preparatory to forming the simulated eminentia.

Drawing FIGURES 18 to 20 and 28 do, however, serve to illustrate that when the condyle drills are attached to the lower transfer frame the centers of the hemispherical ends thereof are aligned with the axis of the mandible 19, just as the reference openings of the lower pair of alignment posts had earlier been aligned with that same axis.

Drawing FIGURES 42, 43, 45, and 46 indicate that the eminentia boxes have small dimples in the outer surfaces of their side walls which are aligned with the axis 18. These dimples on the outer ones of the side walls are useful in transferring dental models to the upper mounting frame 171 or 271, as the case may be. Conventional transfer face bow calipers may be referenced to these dimples and to point 13 in pad 113.

Figures 55, 56:
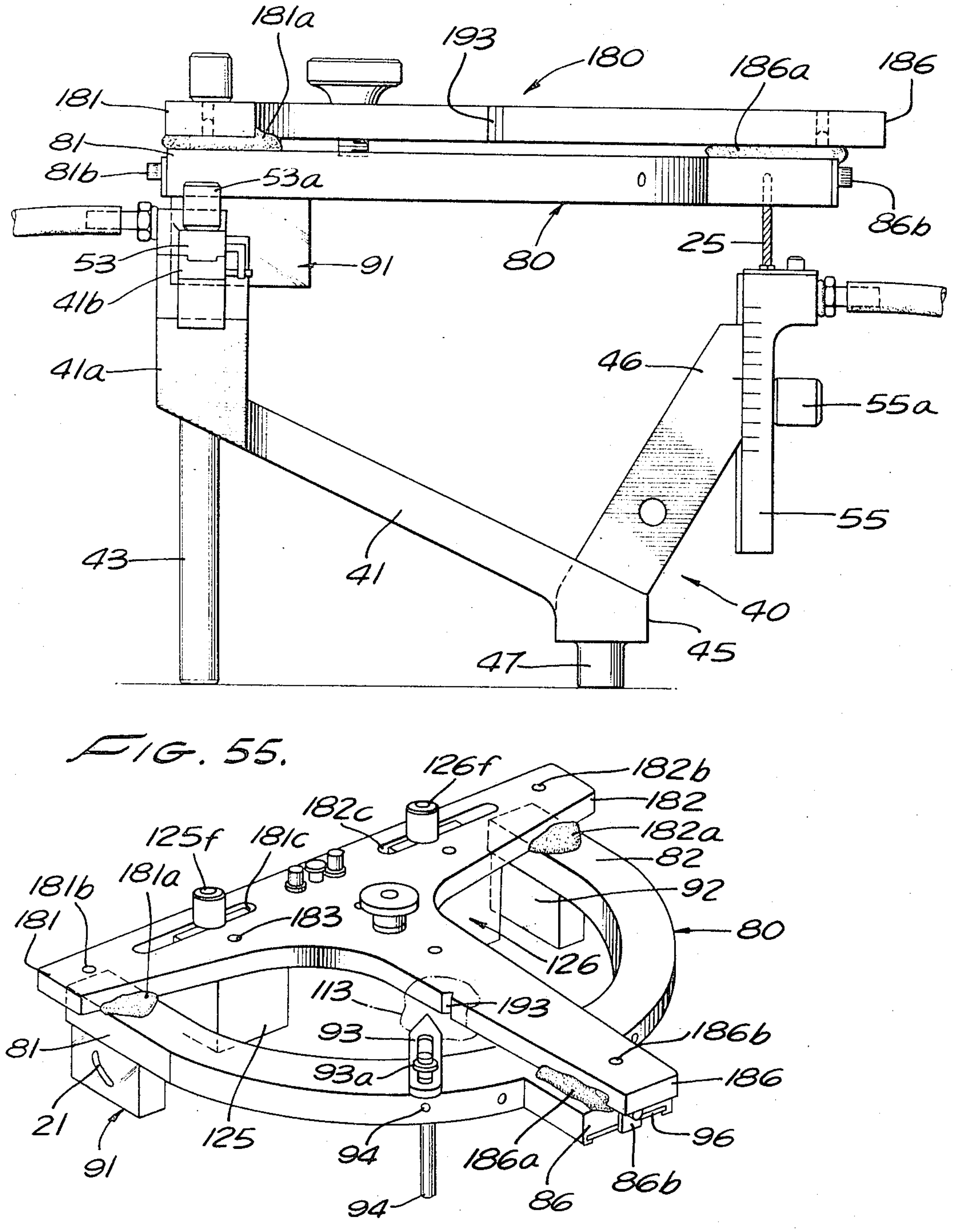
FIGURE 55 is a side elevational view of the apparatus shown in FIGURE 54.
FIGURE 56 is a top perspective view of the upper face bow and upper transfer frame assembly, after the upper transfer frame has been attached to the eminentia boxes.

The upper transfer frame and upper face bow are not aligned in a precisely predetermined manner, for reasons which will subsequently be described. A floating attachment between these two members is achieved at three points by means of formable plastic attachment pads 181*a*, 182*a*, 186*a*. FIGURE 53 shows the attachment pads when first placed on the upper transfer frame; FIGURE 54 illustrates the alignment of both transfer frames with both face bows in order to form the plastic pads to the proper configuration and height; and FIGURE 56 shows the upper face bow and upper transfer frame assembly after the plastic pads have hardened.

After the alignment procedure has been completed the alignment posts 151, 152 and 191, 192 are disconnected. The lower transfer frame 140 and lower face bow 40 remain secured together as a single structural unit which is referenced to the axis of the mandible 19. See FIGURES 18 and 20. The upper transfer frame 180 and upper face bow 80 also remain secured together as a unit and are referenced to the terminal hinge axis 18. See FIGURE 56. These two units then simulate the lower and upper jaws, respectively.

Figure 44:
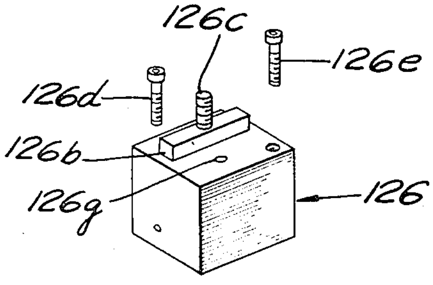
FIGURE 44 is a perspective view, patrially exploded, of one of the eminentia boxes and its fastening means.

The eminentia boxes 125, 126 are utilized to contain and support the blank simulated eminentia. The boxes are designed as molds, and soft plastic material is poured therein and permitted to harden to thus provide rigid plastic castings serving as the blank eminentia. FIGURE 44 shows the structure of box 126, including an elongated lug 126*b* which protrudes above the upper wall of the box and is adapted to be received in one of the slideways 181*c*, 182*c* of the upper transfer frame. Retaining screw 126*c* projects above the lug and nut 126*f* is attached thereto for securing the box to the frame. The box also has a dowel hole 126*g* formed in its upper wall, which is aligned with one of the dowel holes 181*d*, 182*d* of the upper transfer frame, and secured by a corresponding dowel pin 183 or 184. See FIGURES 42 and 46. It will thus be seen that the eminentia boxes 125, 126, when attached to the upper transfer frame 180, are separated by a predetermined lateral distance. The openings representing the simulated eminentia are laterally spaced, as nearly as possible, with the same separation distance as the real eminentia of the patient. However, the lateral width of the boxes is sufficient to permit this variation.

Each of the boxes 125, 126 has a removable wall 125*a*, 126*a* on its rearward side, and these walls are held in place by rubber bands when the plastic material is poured into the boxes. After the plastic material hardens the walls 125*a*, 126*a* are removed. As shown in FIGURE 44 relative to box 126, a pair of retaining screws 126*d*, 126*e* are inserted into the box through corresponding openings in its top wall, and extend downward into the interior of the box. See FIGURES 45 and 47. These retaining screws are inserted before the box is attached to the upper transfer frame, and hence they are in place when the plastic material is poured. They serve to hold the plastic casting in place, and also make it possible to remove the plastic casting and later reinsert it precisely in its original position.

Figure 30:
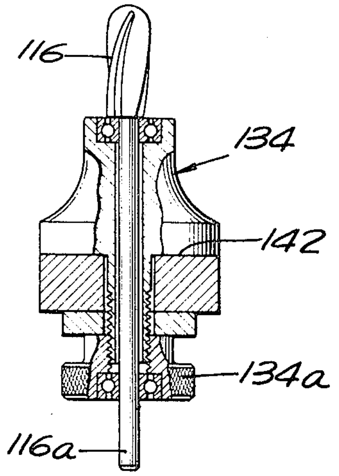
FIGURE 30 is an elevational view, partially in cross-section, of one of the condyle drill assemblies, taken on the line 30—30 of FIGURE 28.
Figure 31:
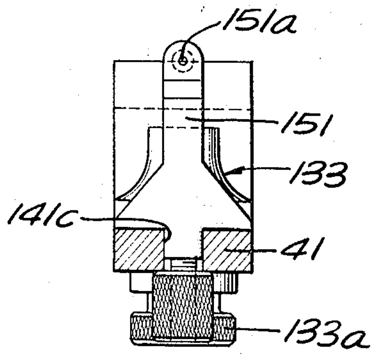
FIGURE 31 is a cross-sectional view taken on the line 31—31 of FIGURE 28.

The condyle drills 115, 116 are supported from corresponding drill carriages 133, 134. The structural arrangement of the carriage is shown in FIGURE 30, where it will be seen that the drill 116 has a stem 116*a* whose lower end projects beneath the drill carriage and hence is available for a power drive connection to the drill. Proper intercondylar width and symmetrical spacing of the drills is achieved using the scale markings 141*d*, 142*d*, of FIGURES 19 and 57.

During the transfer when the upper transfer frame has been secured to the upper face bow, a pad 13 of formable plastic material is placed on the transfer frame notch 193 so as to engage the end of the pointer 93. See FIGURE 56. This accomplishes a transfer of the tattoo point 13 to the upper transfer frame.

Figures 65, 66, 67, 68:
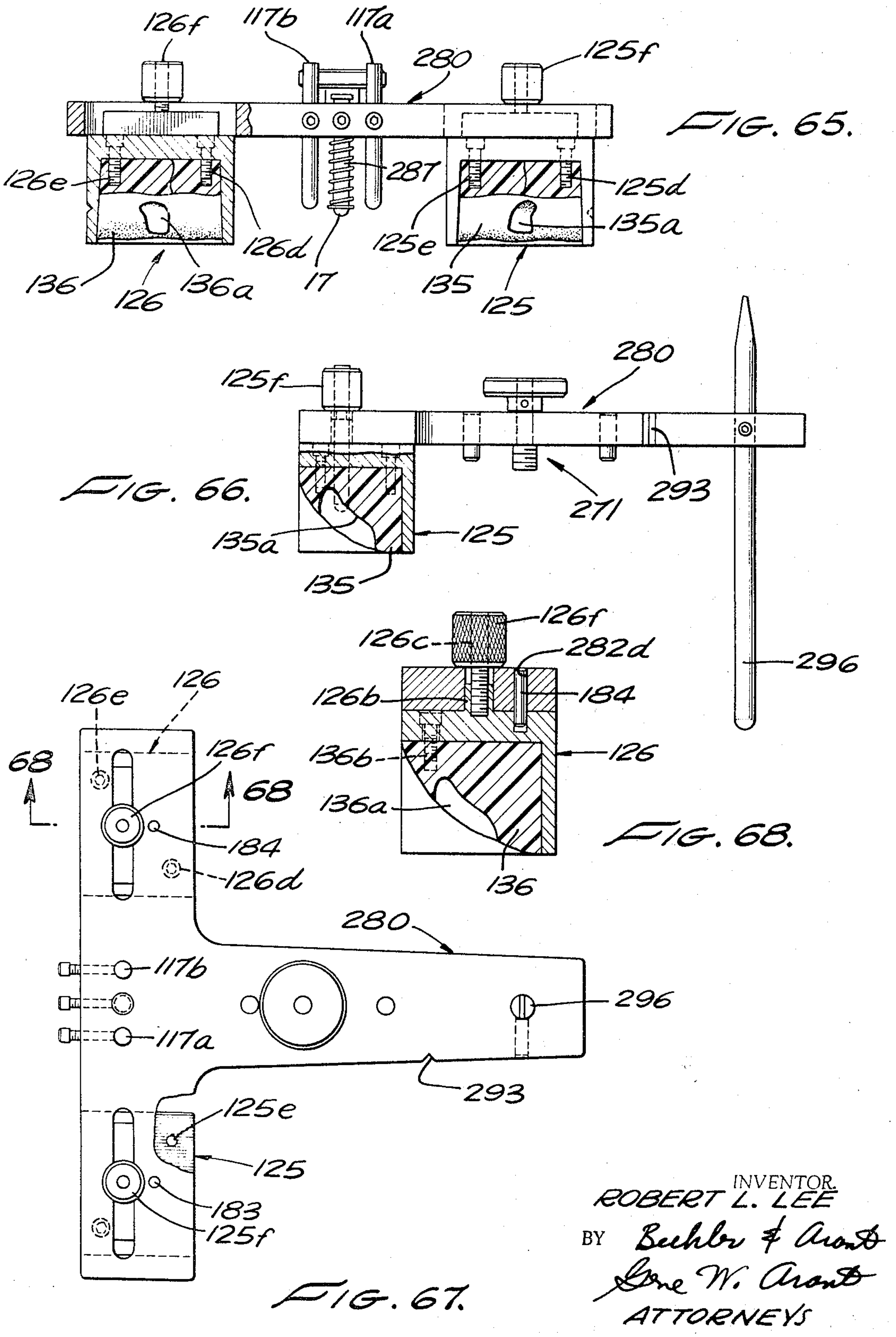
FIGURE 65 is a rear elevational view of the articulator upper frame with simulated eminentia in position thereon.
FIGURE 66 is a side elevational view, partially in section, of the articulator upper frame.
FIGURE 67 is a top plan view of the articulator upper frame.
FIGURE 68 is a cross-sectional view of the left simulated eminentia taken on the line 68—68 of FIGURE 67.

When the upper transfer frame 180 and upper face bow 80 have been secured together, and the eminentia boxes thereafter attached, as shown in FIGURE 56, the apparatus may then be turned upside down for pouring soft plastic into the boxes. The backplate of each box is held in place by means of a rubber band 129, as shown in FIGURE 58. In the meantime smooth-surfaced condyle pins 115*b*, 116*b* have been inserted into the drill carriages 133, 134 in lieu of the condyle drills. The upper face bow and upper transfer frame assembly is then returned to its original upright position, as shown in FIGURE 57, and the condyle pins are then utilized to form initial openings in the plastic material. Then the upper assembly is removed, the plastic material is allowed to harden, the rubber bands and backing plates are removed, and the rear sides of the simulated eminentia are ground down. In order to grind the simulated eminentia it is necessary to remove them from their boxes, and this is done by first detaching the boxes from the upper transfer frame 180. The holding screws 125*d*, 125*e* and 126*d*, 126*e* are then removed, as are also the dowel pins 183, 184. The dowel holes 125*g*, 126*g* are then used as knockout holes, in order to remove the plastic castings from the boxes. After the grinding operation the castings are then replaced with shorter holding screws, leaving a space below the end of each holding screw such as the space 136*b* shown in FIGURE 68. FIGURES 65 and 68 show the curved configuration of the rear surface of the simulated eminentia 135, 136.

Figure 59:
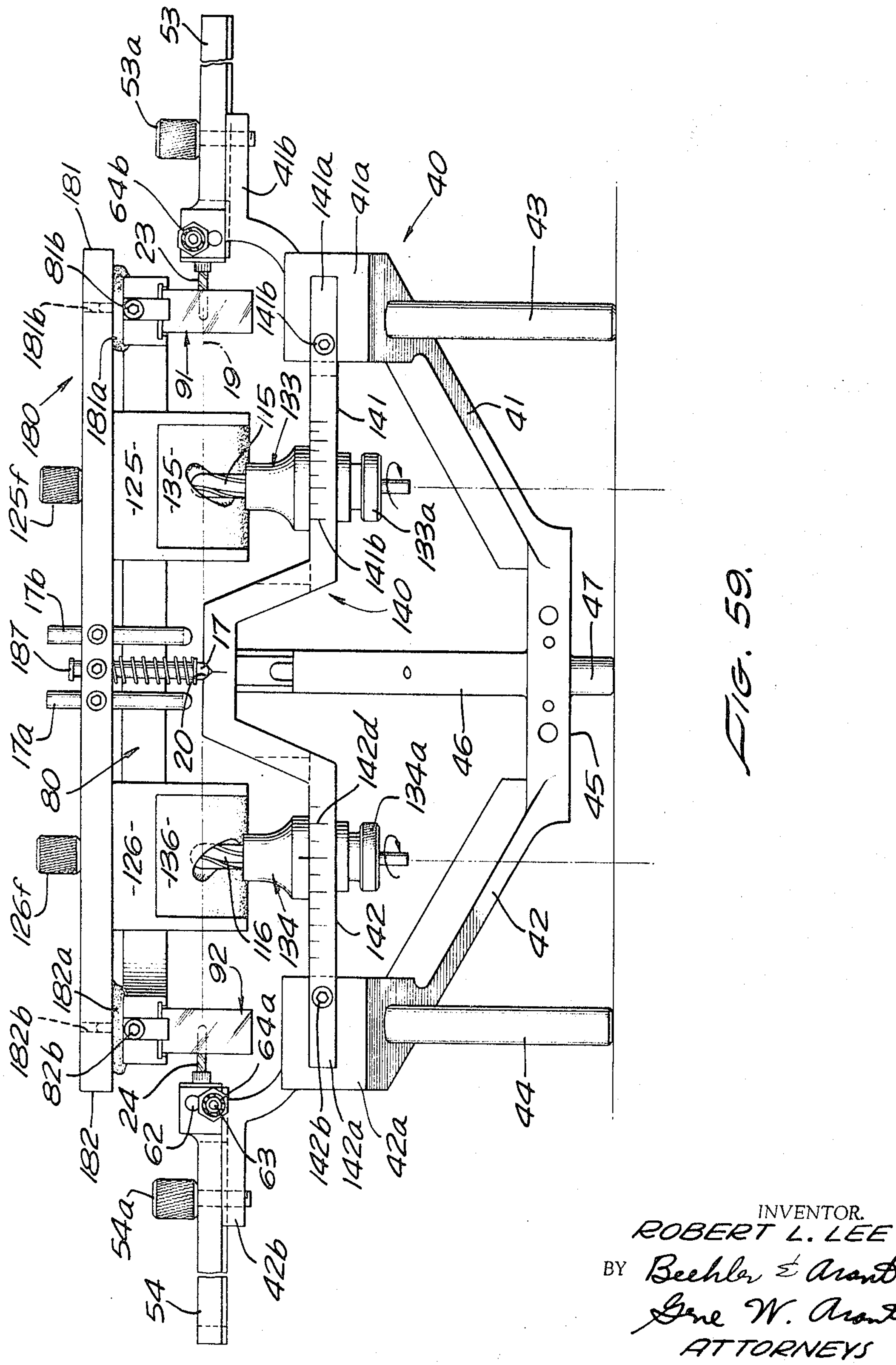
FIGURE 59 is a rear elevational view of the face bows and transfer frames assembled together during the information transfer, and showing the drilling of the simulated eminentia under control of the original jaw movement recordings.
Figures 60, 61, 62, 63, 64:
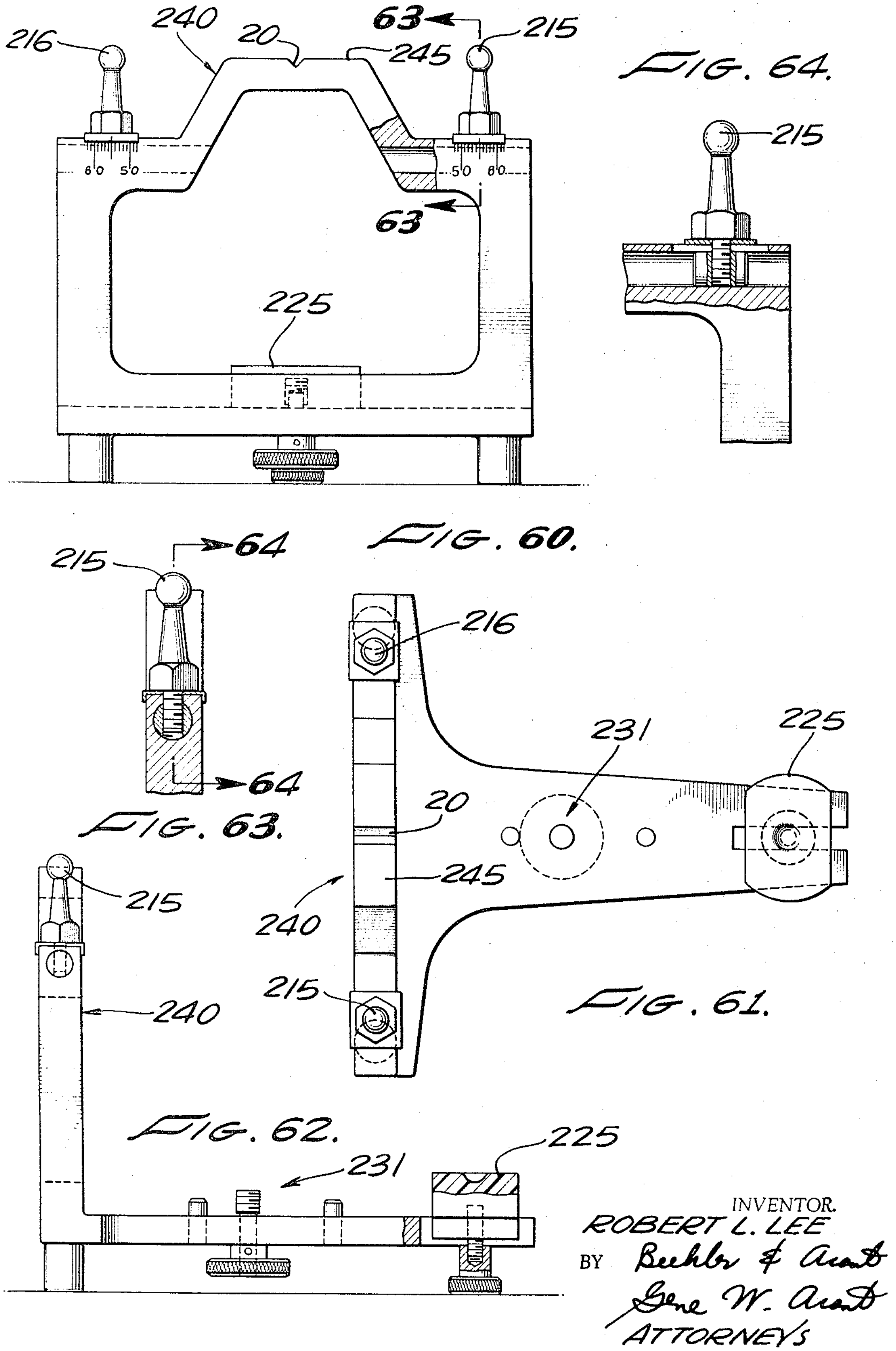
FIGURE 60 is a rear elevational view of the articulator lower frame.
FIGURE 61 is a top plan view of the articulator lower frame.
FIGURE 62 is a side elevatioanl view of the articulator lower frame.
FIGURE 63 is a cross-sectional view taken on the line 63—63 of FIGURE 60.
FIGURE 64 is a cross-sectional view taken on the line 64—64 of FIGURE 63.

The condyle drills are then replaced in the drill carriages, the upper assembly is again coupled to the lower assembly, and the entire transfer apparatus then appears as shown in FIGURE 59. The condyle drills 115, 116 are then rotatably driven, by means not shown, coupled to the respective drill stems 115*a*, 116*a*. The upper assembly is then manipulated relative to the lower assembly, the path of relative movement being controlled by the original recordings 91, 92, 96 and their respectively associated drills, or substituted smooth pins. During this procedure no power drive is applied to the drills 23, 24, 25.

Particular attention is called to axis 19 in FIGURE 59 representing the longitudinal axes of the drills 23, 24. This is the axis of the mandible as illustrated earlier in FIGURE 20. It will be understood, however, that during this transfer procedure when the simulated eminentia are being drilled, the upper face bow and upper transfer frame assembly has its own axis, which is the terminal hinge axis 18.

When the drilling of the simuated eminentia has been completed, they then have respective openings 135*a*, 136*a* formed therein, as best seen in FIGURES 65, 66 and 68. These two openings then store the entire information regarding the relative movement of the jaws, and are ready to be used as substitutes for the real eminentia in the articulator, or playback apparatus.

Alternatively, the drills 23, 24 may be removed, and the transfer apparatus itself may be used as an articulator or playback device. A blank wafer 96 is substituted for the recording wafer and provides frontal support while the simulated eminentia control the movements. As best seen in FIGURE 43 or FIGURE 53 the upper transfer frame 180 has a central portion 171 thereof, whose underneath surface provides an upper mounting frame for mounting a model of the upper tooth structure. A removable lower mounting frame 131 is provided as a separate unit, and can be attached to the lower face bow 40 as is shown in FIGURES 18 and 22. The lower mounting frame then receives a model of the lower tooth structure.

It is much preferred, however, to use a separate articulator for the playback, and this apparatus is shown in FIGURES 60 to 69, inclusive. The articulator upper frame 280, as best seen in FIGURES 67 and 69, is very much similar to the upper transfer frame 180. The articulator upper frame has a pair of dowel holes 281*d*, 282*d* which are separated by precisely the same distance as the dowel holes 181*d*, 182*d* of the upper transfer frame. The eminentia boxes 125, 126 are simply detached from the upper transfer frame, and are then attached to the articulator upper frame in the same relative positions that they had previously occupied, with the dowel pins 183, 184 then occupying the dowel openings 218*d*, 282*d*, respectively. These relationships are shown in FIGURES 42, 46, 67, and 68.

In the articulator the condyle balls 215, 216 supported from the articulator lower frame 240 have the same relative positions as the condyle drills (or substituted pins) 115, 116. The lower frame provides vertical support at the frontal location by means of a pad 225, in conjunction with a support pin 296 on the articulator upper frame.

The articulator upper frame 280 also has a notch 293 which corresponds to the notch 193 of the upper transfer frame, and the plastic pad 113 is therefore simply detached from the upper transfer frame and reattached to the articulator upper frame, as shown in FIGURE 69, so as to thereby establish the tattoo mark 13 in the articulator. Location of this mark is essential for transferring dental models from and to the patient.

The articulator also contains the same structure as the transfer frames for establishing the centric reference point 17 on the terminal hinge axis, and the centric reference point 20 on the axis of the mandible. As best seen in FIGURE 65 there are provided on respective sides of the centric reference pin 287 a pair of centric safety pins 117*a*, 117*b*. The safety pins 117*a*, 117*b* are rigid members which are vertically slidable in respective openings in the articulator upper frame, and secured by respective set screws in selected positions of vertical adjustment. It is helpful to the dentist to so position these pins that they provide a visual indication of centric.

*The frontal recording*

In accordance with the preferred method of the present invention, when the lateral record members 91, 92, and their associated drills 23, 24 are carefully aligned on the extended hinge axis, the record members will then store all of the condylar movement information. Recording of information in the front recording wafer 96 is unnecessary. A smooth-surfaced pin may be substituted for the front drill 25, and the pin together with wafer 96 will provide a convenient means for supporting the frontal portion of the upper face bow assembly.

However, there is some mechanical advantage to be gained by recording in the front wafer 96, because a more positive control of the gyrations of the upper face bow and upper transfer frame assembly for the purpose of information transfer when the simulated eminentia are being drilled is thereby gained. Recording of the jaw movements in the wafer 96, as well as the record members 91, 92, is therefore preferred.

Figures 78A, 78B:
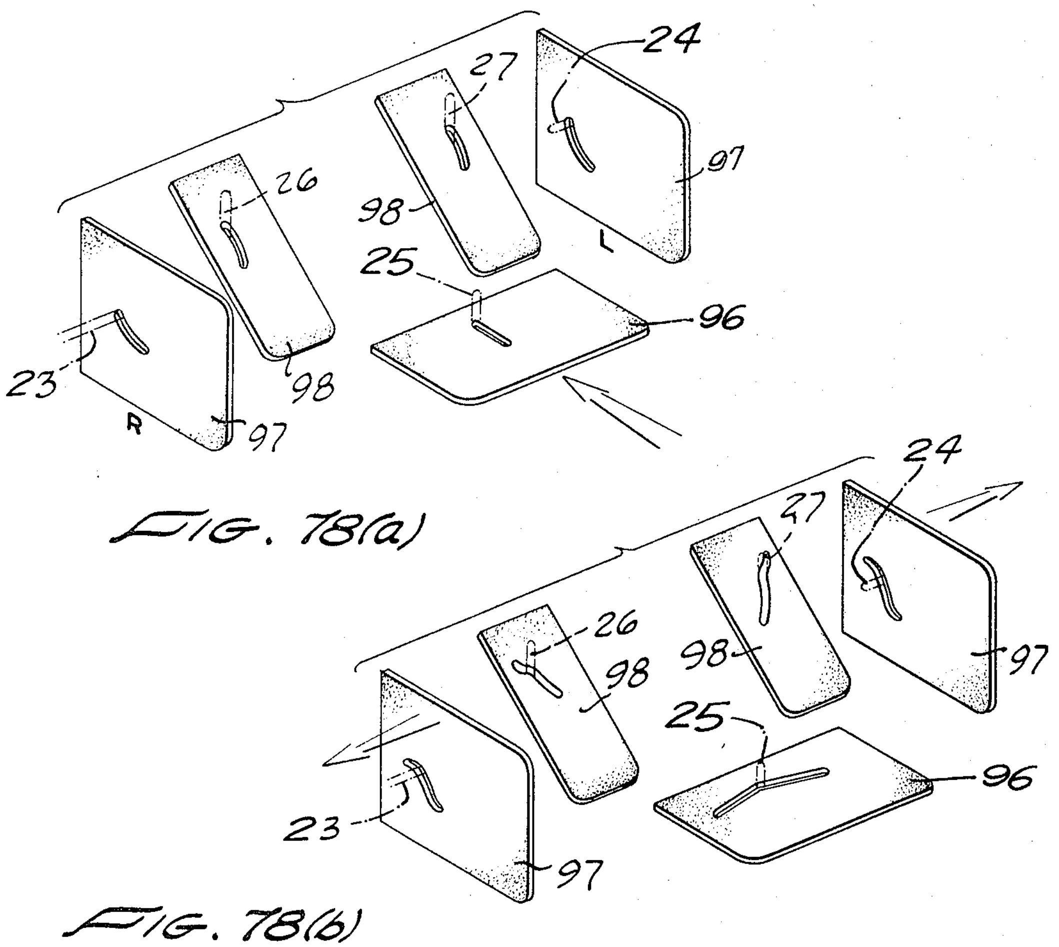
FIGURE 78(*a*) is a perspective view of a set of recording wafers in which the protrusive movement has been recorded by utilizing transducers of the type shown in FIGURE 77.

Another advantage of recording in the wafer 96 is that it facilitates scientific study of the jaw movements, because it can be readily determined by visual inspection whether a purely protrusive movement has been made, or a lateral movement which is at the extreme border of such movement possibilities, or some intermediate path of movement. The configurations of typical recordings are shown in FIGURES 78(*a*) and 78(*b*).

An additional advantage of the front recording wafer 96 is that it can conveniently be used as a guidance means. A slot of predetermined configuration may be cut in the wafer, the drill 25 or a substituted pin may be interengaged with the slot, and the mandible of the subject may be thereby guided on a predetermined path of movement. This procedure is of value in making scientific studies of jaw movements, and particularly where comparative results are desired. It is also of value in the application of the instrument to practical dentistry, for the following reason. It is recognized that the purely protrusive movement, shown in FIGURE 78(*a*), and the extreme border or left and right lateral movements, shown in FIGURE 78(*b*), provide a greater amount of information as to jaw movement limitations than do other intermediate paths of movement. Accordingly, there is an advantage in recording a straight, absolutely precise forward or protrusive movement, as contrasted with a wobbly or sloppy protrusive movement. The procedure is to first locate centric and drill the centric opening which is indicated in FIGURE 78(*a*) by the numeral 25. Then the wafer is removed from the apparatus and a slot is cut therein which extends with mathematical precision in the forward direction. The wafer may then be returned to the instrument where it is used as a guidance device.

*Detailed procedure*

Certain rather sensitive steps of operating procedure are explained in more detail, as follows.

Before recording the jaw movements it is necessary not only to align the drills 23 and 24 to the terminal hinge axis, but also to locate the points 21, 22 in space so that they are equal distances from the tattoo marks 11, 12. The drill carriages are provided with stop means 53*b*, 54*b*, which coact with their associated supporting wings of the lower face bow, in order to establish reference positions which are equidistant from the lateral center of the instrument. As shown in FIGURE 51 the stop consists of a fixed pin attached to the drill carriage, and a removable pin which may be selectively inserted in any one of three openings in the face bow wing. The lower transfer frame 140 has scale markings 141*d*, 142*d* on its lateral arms, and this device is used as a convenient measuring instrument to initially position the drills 23, 24 with a lateral separation which corresponds to the lateral separation between the tattoo marks 11, 12, and at the same time to center the drills with respect to the lateral center of the instrument by reference to the centric reference point 20. The lower face bow is attached to the subject and its mounting means manipulated so that the ends of the drills 23, 24 are in contact with the tattoo marks 11, 12 respectively. The longitudinal axis of the drills, corresponding to the axis of the mandible 19, are therefore initially aligned with the terminal hinge axis 18. Thereafter the drills are retracted to the stop positions, which as previously stated are symmetrically located relative to the lateral center of the instrument, thereby establishing the recording points 21, 22.

In order to be able to attach the upper face bow 80 with its associated record members 91, 92 it is necessary to retract the carriages 53, 54 beyond their stop positions. The ends of drills 23, 24 are then aligned as well as possible with the centric dimples 21*a*, 22*a* of the record members 91, 92, but precise alignment is not necessarily achieved. The stop position limit the cutting depth of the drills when initially drilling the centric opening.

During recording it is greatly preferred to utilize a first pair of record members 91, 92 for recording the border or lateral movements, and thereafter utilize a second pair of the record members to record the protrusive movement. A single wafer 96 may be used to record both movements, and in fact, is preferably used to guide the protrusive movement in the manner previously described in order to obtain an absolutely straight protrusive movement.

After recording is completed and the face bows are removed from the subject, it is then necessary to attach the lower transfer frame to the lower face bow, and align the upper transfer frame with the lower transfer frame, as previously described. In aligning the two transfer frames the centric safety pins 17*a,* 17*b* are initially lifted above their normal positions. Then when the alignment by means of the two pairs of axis alignment posts and associated pins has been completed, the centric safety pins are lowered until they make contact with the upper surface 145 of the lower transfer frame, as shown in FIGURE 54. This setting of the safety pins 17*a,* 17*b* is useful at a later time, to avoid making the initial openings in the simulated eminentia too deep.

At the time of final alignment of the upper transfer frame to the upper face bow, illustrated in FIGURE 54, the drills 23, 24 occupy the upper limit positions 21, 22 (shown in FIGURE 3) of the protrusive recordings, and are held there by the weight of the apparatus. A reliable alignment of the axis 18 of the upper face bow with the axis 19 of the lower face bow is therefore achieved. Before the plastic attachment pads hardens the upper transfer frame is moved laterally as necessary, until the centric reference pin 17 drops into the notch 20, thereby assuring the correct lateral alignment of the upper and lower transfer frames relative to each other.

After the eminentia boxes have been attached and filled with plastic material, the upper assembly including the upper transfer frame, upper face bow, and eminentia boxes must be lowered vertically toward the lower assembly consisting of the lower face bow and lower transfer frame. The centric safety pins 17*a,* 17*b* are useful in preventing the upper assembly from dropping too low, and hence are useful in preventing the condyle pins 115*c,* 116*c* from making initial openings in the simulated eminentia 136, 136 that are too deep. The drill carriages 53, 54 are at that time in laterally retracted positions, and the upper limit positions of the protrusive recordings in the record members 91, 92 may also be observed to make sure that they are not lowered vertically below the drill ends. After the centric openings are made the pins 17*a,* 17*b* are then raised, as well as the pin 187, to avoid interference with the information transfer.

Alternatively, the upper and lower assemblies may be kept attached together, and turned upside down, to pour plastic into the boxes. The plastic is then formed directly around the pins 115*c,* 116*c* and the correct depth of the initial opening is automatically established.

Since two sets of record members 91, 92 are used in recording, two such sets must also be used during information transfer. The protrusive recordings are utilized in aligning the transfer frames, and it is therefore convenient to first actuate the condyle drills 115, 116 under control of the protrusive recordings. When that information transfer has been completed the protrusive recordings are removed, and are replaced with the border movement recordings, and the condyl drills 115, 116 are again actuated for transferring the additional information. If the intermediate paths of movement are believed significant additional pairs of recordings may of course be made.

*Alternate forms*

Figures 70, 71:
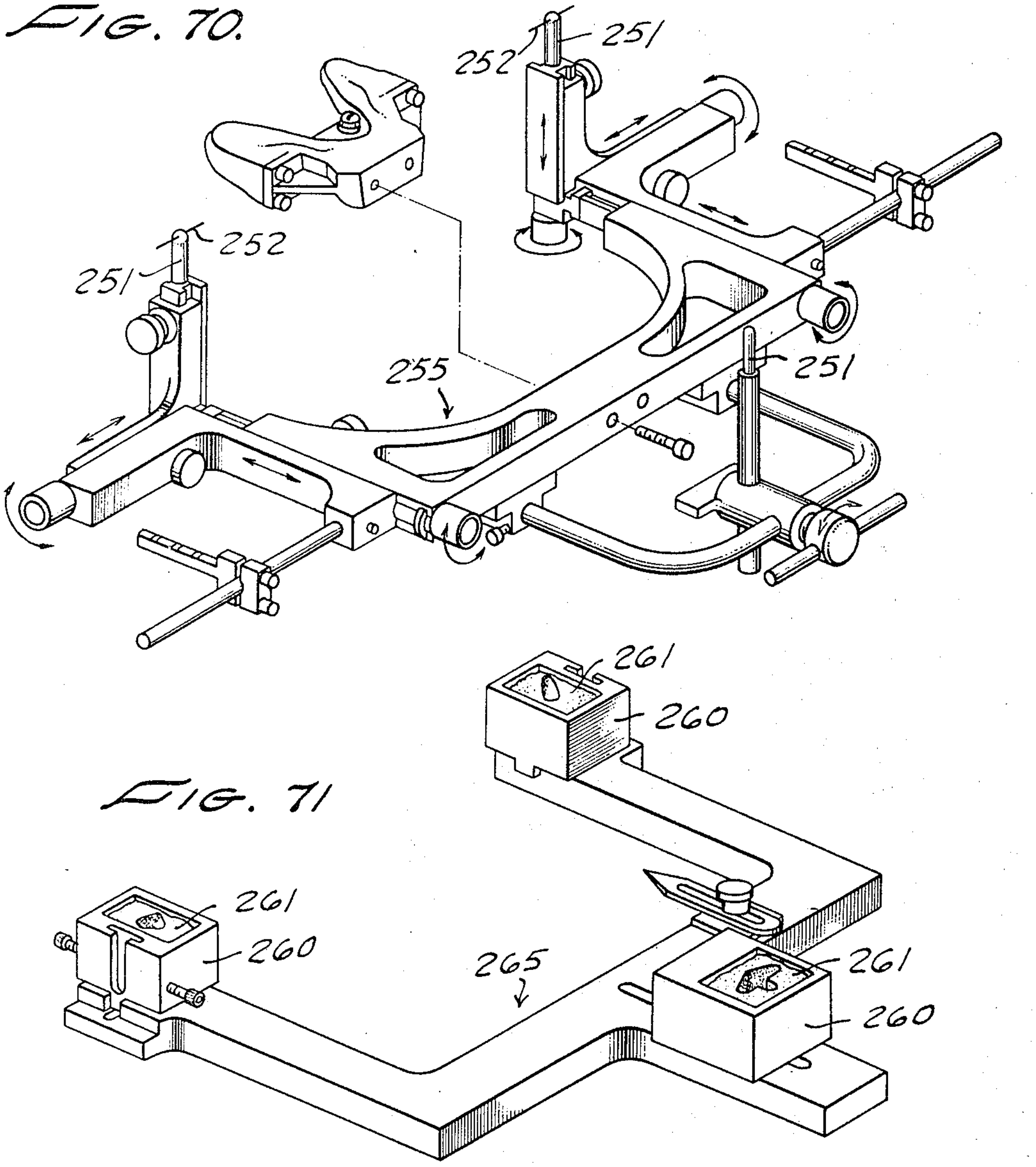
FIGURE 70 is a perspective view of the lower face bow assembly of a first alternate form of recording apparatus in accordance with the invention.
FIGURE 71 is an upside down perspective view of the upper face bow assembly corresponding to the apparatus of FIGURE 70, and showing the configuration of the completed recordings.
Figure 72:
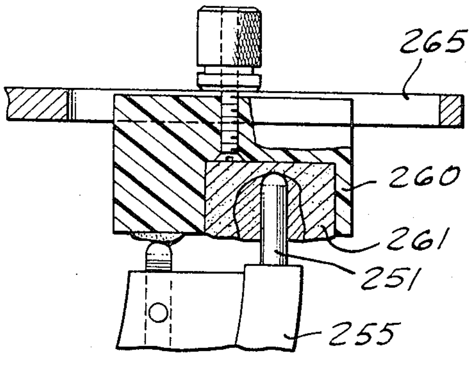
FIGURE 72 is a cross-sectional view of the frontal recording box of FIGURE 71, and is associated stylus, during information transfer.

In the embodiment of FIGURES 70 to 72 a vertical recording pin 251 having a smooth hemispherical end is utilized at each of the lateral recording locations as well as at the frontal recording location, all of the recording pins being attached to the lower face bow 255 for movement with the mandible. A corresponding set of three recording boxes 260 are attached to the upper face bow 265, and plastic material 261 is placed therein to be formed by the movement of the pins. The pins in the lateral recording locations have small horizontal openings formed therethrough, which pass through the radius centers of the ends, and small wires 252 are inserted in the openings for purpose of hinge axis alignment. The vertical arrangement of the lateral recording pins causes the recorded information to be affected by the degree of jaw opening of the subject, and accordingly, in preparing for information transfer or playback it is desirable to cut away excess material from the lower portion of the plastic record member, leaving depressions or grooves which are only deep enough to receive the hemispherical end of the pin.

Figure 73:
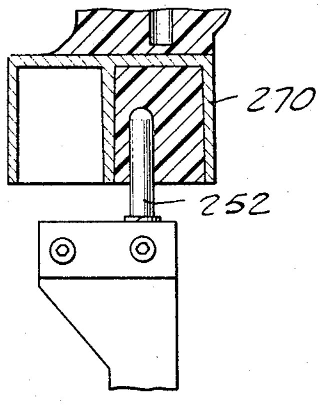
FIGURE 73 is a side elevational view, partially in cross section, of a recording transducer in accordance with a second alternate form of recording apparatus.
Figure 74:
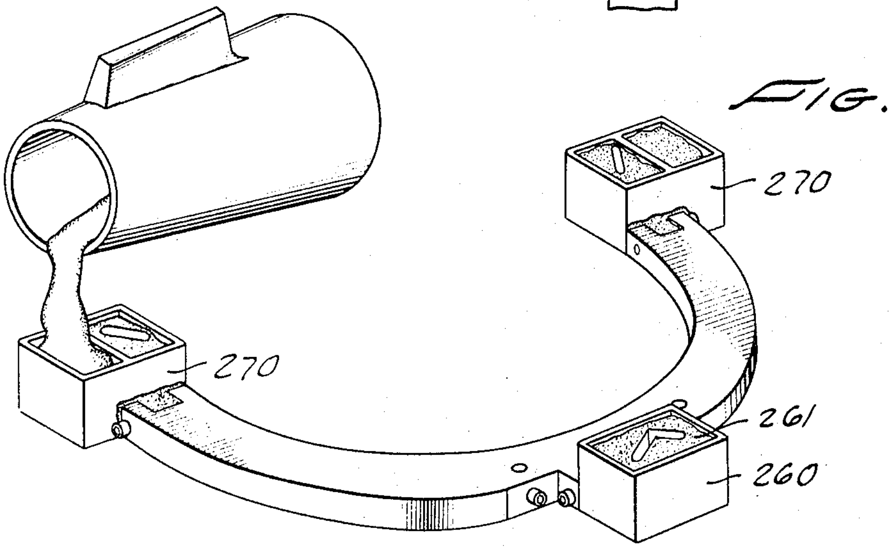
FIGURE 74 is an upside down perspective view of the upper face bow assembly in which the device of FIGURE 73 is uitilized, showing the configuration of the recordings after lateral movements have been recorded but prior to the recordings of the protrusive movement.
Figure 75:
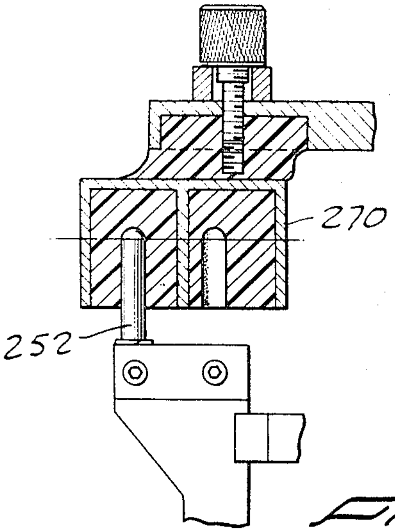
FIGURE 75 is an elevational view, partially in cross-section, of the transducer of FIGURE 73 showing the recording of the protrusive movement.
Figure 76:
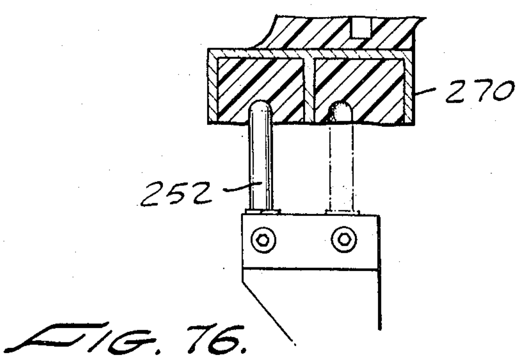
FIGURE 76 is an elevational view of the transducer of FIGURES 73 and 75, after the recordings have been pared down preparatory to the information transfer.

The embodiment shown in FIGURES 73 to 76 is generally similar to the embodiment of FIGURES 70 to 72, but differs in that the lateral recording locations are provided with bipartite recording boxes 270 and two alternate recording pin locations. FIGURE 73 shows the border movement recording. FIGURE 74 shows the recordings as they appear after the border movements have been recorded. When the outer portions of the two lateral recording boxes 270 have been filled with plastic material a protrusive recording is made, placing each lateral recording pin in its outer location as shown in FIGURE 75. FIGURE 76 shows the recordings after they have been cut down or edited so as to leave only the significant information which is that part of the recording engaged by the hemispherical end of the pin. FIGURE 76 shows the information transfer or playback from the protrusive recording, and the alternate location of the pin indicated by the dotted lines is used subsequently for transferring the border movements recording.

Figure 77:
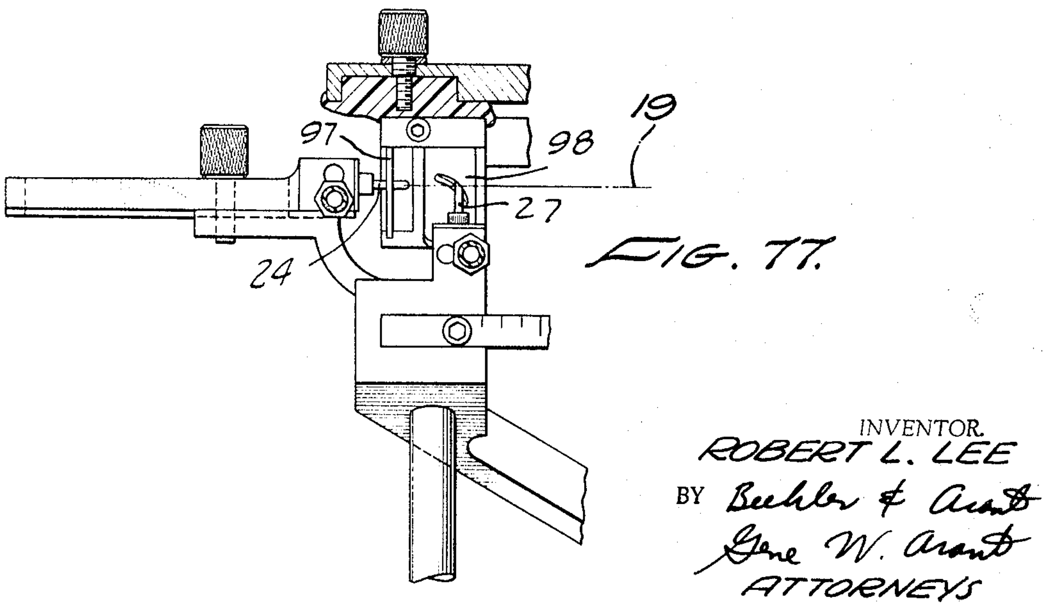
FIGURE 77 is an elevational view, partially in cross-section, of a third alternate form of measurement transducer in accordance with the invention.

In the embodiment of FIGURES 77 and 78 the recordings are made in thin wafers of rigid plastic material, and each individual recording accepts only two-dimensional information rather than three-dimensional. At the front recording location a single wafer 96 is utilized, in the same manner as heretofore described. In each of the lateral recording locations a pair of wafers is utilized, and FIGURE 77 shows the structure and operation of a lateral recording station in which two wafers are being cut simultaneously by respectively associated drills. The outer wafer 97 is vertically aligned and is cut by a horizontally disposed drill 23 or 24 aligned with the axis 19, while the inner wafer 98 is disposed in a plane that would be generally parallel to the rearward surfaces of the simulated eminentia 135, 136, as shown in FIGURES 66 and 68. The inner wafer is cut by a vertical drill 26 or 27 whose longitudinal axis intercepts the axis 19. Therefore, the outer wafer records movements of the axis 19 in the vertical plane, while the inner wafer records the lateral movements of the mandible. The apparatus of FIGURES 77 and 78 is useful in making scientific studies of the jaw movement characteristics, because of the ease and convenience in making direct visual comparisons between sets of wafers recorded from different subjects, or from the same subject under varying conditions.

*Preferred embodiment*

Reference is now made to FIGURES 79 to 82, inclusive, illustrating the presently preferred form of the recording and transfer apparatus of the invention. Many portions of the apparatus are the same as have been previously described, and are given the same reference numerals. These include, for example, the lower alignment posts 151, 152, the upper alignment posts 191, 192, the condyle drills 115, 116 and their associated carriages, the eminentia boxes 125, 126, the lateral record members 91, 92, the drill carriages 53, 54, and the drills 23, 24.

The apparatus includes a lower face bow 340 of generally horseshoe-shaped configuration, and an upper face bow 380 of similar configuration, and it will be noted that in the present apparatus no provision is made for mounting plates whereby the apparatus can be used as an articulator. Upper transfer frame 480 is generally similar to the upper transfer frame 280, and the lower transfer frame 440 is also of T-shaped configuration. The lower transfer frame has slideways which receive the lower alignment posts and the condyle drill carriages, while the upper transfer frame has corresponding slideways which receive the upper alignment posts and the eminentia boxes, in the same manner as heretofore described.

The construction and operation of the lateral drill carriages 53, 54 is the same as heretofore described, including their associated stop means for limiting the drill cut to a predetermined depth when cutting the centric openings. The forward drill carriage 55 and its associated drill 25 (not specifically shown) are also the same as previously described, as is the front recording wafer 96 and the support means by which it is attached to the upper face bow. The structure and operation of the orbital axis pointer 93 is also the same as heretofore described.

The lower transfer frame 440 has a raised central surface providing the centric groove 20, and the upper transfer frame 480 has a centric reference pin with lower point 17. The centric reference pin is, however, adjustable by a set screw, rather than being spring driven. A pair of centric safety pins are also provided in the same manner as heretofore.

One of the novel features of the apparatus is the inclusion of lateral recording boxes 381, 382 which are attached to respective ends of the upper face bow 380, and which are movable and also rotatable in the vertical plane. The upper transfer frame 480 is provided with holes in its three extremities for retaining plastic fastening pads in place, in order to secure it to the recording boxes 381, 382, and to the forward portion of the upper face bow 380.

Another novel feature of this form of the apparatus is the inclusion of alignment blocks 391, 392 which are adapted to be received by the recording boxes 381, 382. These alignment blocks are used first in aligning the upper face bow with the patient or subject prior to recording, and then after recording they are used again to align the upper face bow to the upper transfer frame. The structure and operation of these alignment blocks will now be described in detail.

Figures 80, 82:
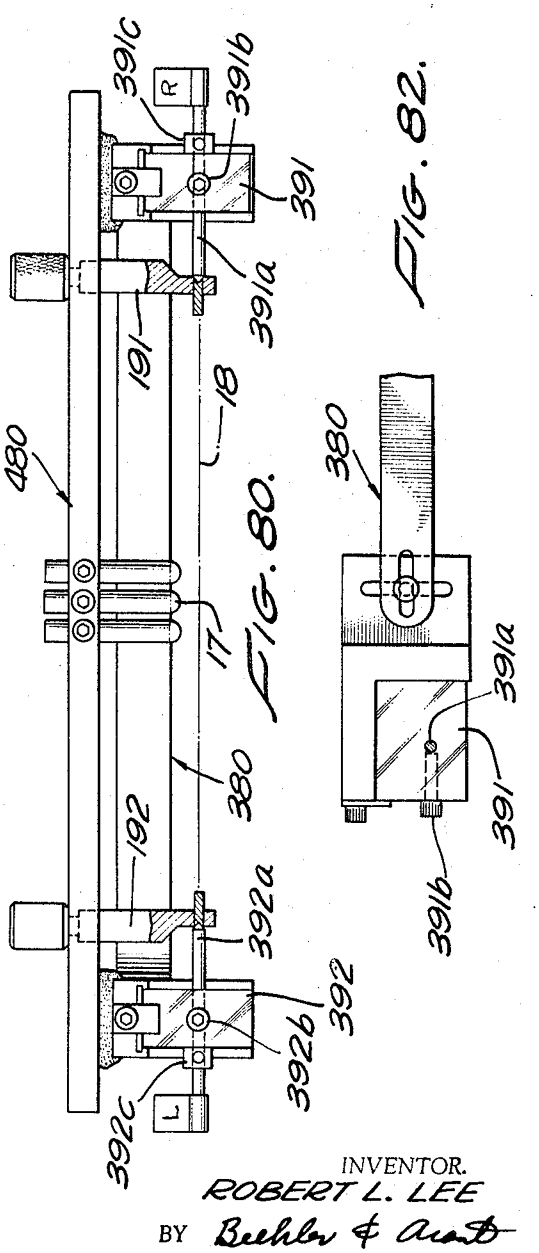
FIGURE 80 is an elevational view of the upper transfer frame and upper face bow of FIGURE 79, coupled together for the purpose of information transfer.
FIGURE 82 is a side view of the right lateral recording box and alignment block of FIGURES 79 and 80.

As best seen in FIGURE 80 the alignment block 391 is of substantially the same size and configuration as record member 91, and has longitudinally flanged upper edges adapted to be received by the recording box 381, in the same manner as the record member 91 is received. Alignment block 391 also has a lateral opening which passes through the approximate center of the block, and which in the arrangement seen in FIGURE 80 is occupied by an elongated axis alignment pin **391*a*. A set screw 391*b* in one end of block 391 secures alignment pin 391*a* in a selected longitudinal position. A collar 391*c* encircles the alignment pin 391*a* adjacent the outer lateral surface of the block 391, and is provided with a set screw which permits it to be fastened at a particular longitudinal position on the pin 391*a*. The function of collar 391*c* is to store information indicating the distance that the pin 391*a* has been inserted into or through the block. On its outer end the pin 391*a* also carries a flag labeled "R," indicating for convenience that block 391*a* belongs on the right hand side of the apparatus. Block 392** is constructed in the same manner, as also clearly seen in FIGURE 80, and is labeled "L."

Figure 79:
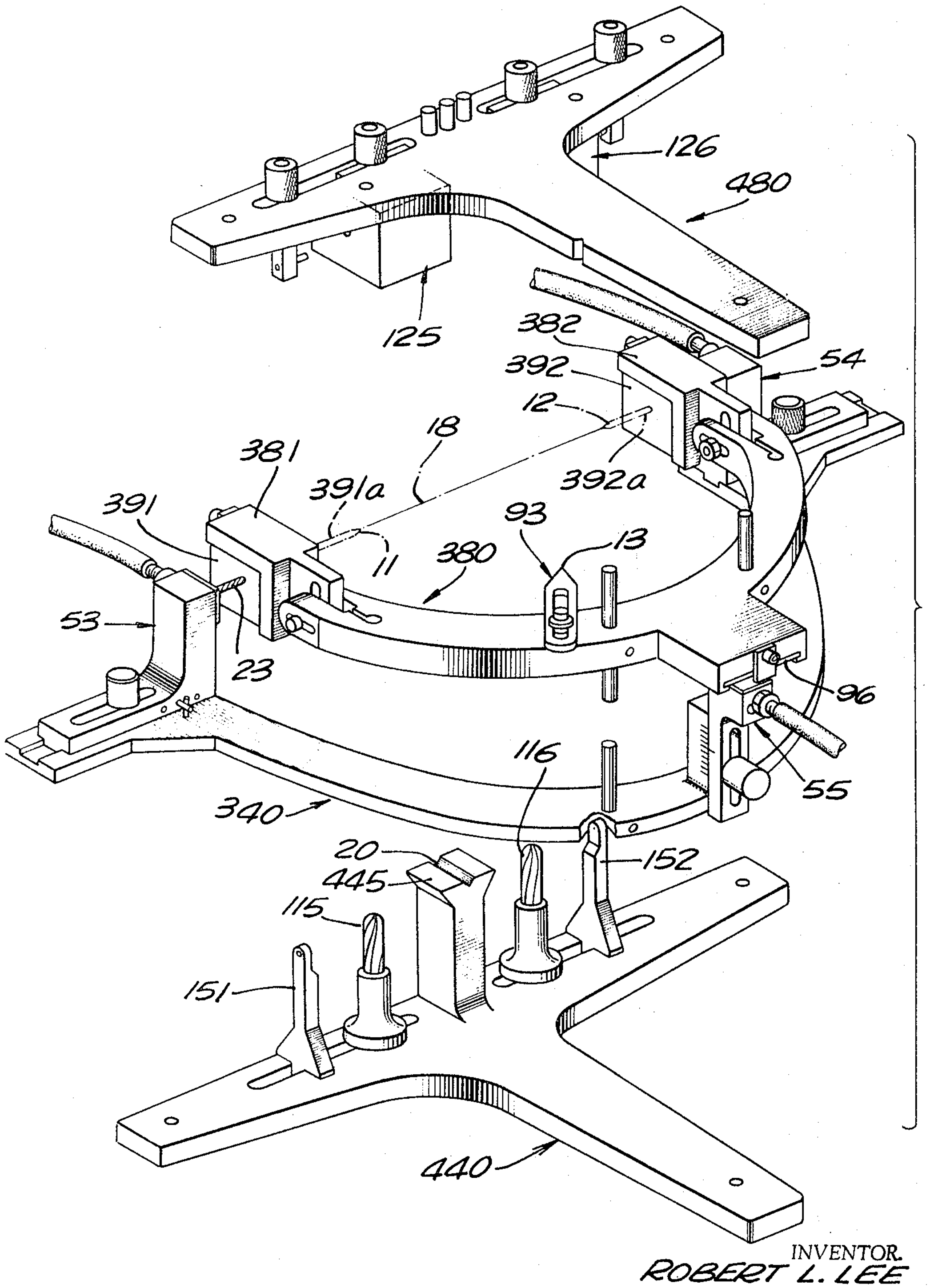
FIGURE 79 is a perspective view of the presently preferred form of recording and transfer apparatus in accordance with the invention.

FIGURE 79 illustrates the usage of the alignment blocks and their respective alignment pins for the purpose of aligning the upper face bow 380, and more specifically, the recording boxes 381, 382, to the terminal hinge axis 18. The points of the pins **391*a*, 392*a* are set a lateral distance apart which is equal to the separation distance between the tattoo marks 11, 12 on the face of the particular subject. They are also arranged to project equal distances from their respectively associated alignment blocks. Where precision work is being done the longitudinal axes of the pins 391*a*, 392*a* are mutually aligned, and the angles and positions of the recording boxes 381, 382** adjusted accordingly. One convenient way of accomplishing such alignment is to utilize a rigid pipe whose interior diameter is equal to the outer diameter of the pins.

Whether or not the longitudinal axes of the pins are precisely aligned, the upper face bow is placed about the face of the subject and the pinpoints (representing points 11, 12 as shown in FIGURE 79) are made to engage the tattoo marks on the subject's face. If precision work is being done all of the necessary adjustment is made in the associated upper mounting means, in the same manner as previously described in connection with the principal embodiment of the invention. However, if precision work is not being done the adjustable mounting means of the upper face bow is utilized to provide only a coarse adjustment, and thereafter fine adjustments are made by varying the angles and positions of the recording boxes 381, 382. When alignment is achieved the adjustments in the adjustable mounting means for the face bow, or the adjustable attachment means for the recording boxes, or both, as the case may be, are then secured.

In FIGURE 79 the pins **391*a*, 392*a* are indicated in dotted lines, to show that they had been utilized for alignment purposes and had subsequently been removed. The drills 23, 24** are then inserted in the horizontal openings of the alignment blocks which had formerly been occupied by the pins.

More specifically, the adjustable mounting means which supports the lower face bow 340 from its associated clutch is first loosened, to permit relatively free movement of the lower face bow. Then the drills 23, 24 are aligned with the horizontal openings in the alignment blocks, and the carriages 53, 54 are moved laterally inwardly so as to fully engage the drills with the blocks. The blocks then serve not only as an alignment device, but also as a means of physical support for the lower face bow and its associated apparatus, thus relieving the dentist of supporting the face bow and apparatus in this precisely aligned position by hand.

After the drills 23, 24 are engaged with the alignment blocks the adjustable mounting means for the lower face bow is still left in a loose or adjustable condition, and the patient or subject is carefully controlled to establish the centric relation of his jaws. At the time of guiding the patient's mandible to centric, the dentist has his hands free for this purpose because the lower face bow 340 is being supported from the upper face bow 380, through the medium of the alignment blocks. After the patient's jaws is in centric the adjustable mounting means for the lower face bow is secured.

The next step is to move the drill carriages 53, 54 laterally outward to disengage the drills from the alignment blocks. The alignment blocks are then removed from the recording boxes 381, 382, and are replaced by the record members 91, 92. Recording is then commenced and performed in the manner previously described.

In the illustrated form of the apparatus the frontal recording is achieved in two dimensions only, by means of the wafer 96, and this is quite satisfactory when the drills 23, 24 are precisely aligned on the extended hinge axis. If, however, the hinge axis alignment is not precisely done, it is then preferred to utilize a three-dimensional recording in the frontal location, in the manner indicated in FIGURES 71 and 72.

The recordings are preferably made in the same manner as previously described, with border movements being recorded in one set of record members, and protrusive being recorded in a separate set of record members. The reference point 13 will be recorded at this time if that has not previously been done. The information transfer is then ready to be commenced.

The upper and lower face bows are now removed from the patient's head, the patient is dismissed after removal of the clutches and mounting means, and the upper and lower face bow assemblies are transferred to the laboratory for further work.

The drill carriages are now laterally withdrawn, and the record members are removed from the recording boxes and replaced with the alignment blocks. The upper face bow 380 and upper transfer frame 480 are now ready to be joined together in the manner illustrated in FIGURE 80. Plastic attachment pads are placed on the upper transfer frame in the same manner as previously described, the upper transfer frame is placed over the upper face bow to engage the pads therewith, and the upper pair of axis alignment posts 191, 192 are then utilized in conjunction with the axis alignment pins 391*a*, 392*a* in order to establish a common reference axis 18 of this assembly. Then the plastic pads are permitted to harden.

The next step is to remove the pins 391*a*, 392*a*, and then the alignment blocks. The record members 91, 92 containing the protrusive recordings are now inserted. The drills 23, 24 are then replaced with smooth-surfaced pins, and the carriages 53, 54 are moved laterally inward so as to drive the pins to their full depth into the recording cuts in the outer surfaces of the record members 91, 92. The outer ends of the lower face bow are then supported by separate means, permitting the weight of the upper face bow and upper transfer frame to be borne by the horizontal pins, in order to reliably preserve the centric relation. Thus the weight of the apparatus insures the preservation of this alignment, as heretofore described.

The lower transfer frame and its alignment posts 151, 152 are then assembled together, and plastic attachment pads 441, 442, 443 are placed on the lower frame. While the pad 443 is not specifically shown in the drawings, it is evident from FIGURE 79 that it is placed at the bottom of the T of lower frame 440, where it can engage the undersurface of the frontal portion of the lower face bow 340 in the region adjacent to drill carriage 55.

The lower transfer frame is then brought into alignment with the other parts of the assembly, and the alignment pins used to connect the pairs of axis alignment posts together. The plastic attachment pads 441, 442, 443 are thereby formed to such size and configuration as to provide a common axis of alignment for the lower transfer frame 440 and lower face bow 340. The upper and lower transfer frames must be moved laterally relative to each, to insure engagement of the centric pin 17 with the centric notch 20, before the plastic pads are hardened.

Thereafter the alignment posts 151, 152 and 191, 192 are removed. The eminentia boxes 125, 126 may now be attached to the upper assembly, while the condyle drills 115, 116 are attached to the lower assembly. Information transfer can now be initiated in the same manner as previously described.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. The method of measuring three-dimensional jaw movements and of transferring the information thus obtained to a jaw movement simulator, comprising the steps of:

first measuring, at a plurality of measurement locations external to the jaws, a selected first set of relative jaw movements;

then measuring, at a plurality of measurement locations external to the jaws, a selected second set of relative jaw movements;

transferring one set of the information to a new pair of measurement locations which correspond at least approximately to the actual locations of the jaw joints, and concurrently converting the information to a basis which reflects the shorter radius distance of the new measurement locations from a common center than the radius distance of the original measurement locations from the same common center, by positioning simuated upper joint members at the new measurement locations and forming physical impressions therein;

and thereafter transferring to other set of information, and concurrently converting it in the same manner, to that same pair of locations by correspondingly enlarging the openings in said simulated upper joint members.

2. The method of claim 1 wherein said jaw movement measurements are made precisely on the extended hinge axis.

3. The method of claim 2 wherein said first set of relative jaw movements are the protrusive movements, and said second set of relative jaw movements are the border movements.

4. The method claimed in claim 3 wherein the protrusive movement information is transferred first.

5. The method of transferring recorded jaw movement information from record members each of which has a flat surface in which physical impressions have been formed representing the movements of the hinge axis of the mandible relative to the hinge axis of the maxilla, comprising the steps of:

supporting two of the record members in spaced parallel positions with the surfaces in which the physical impressions are formed being outwardly disposed, and with precisely the same distance between the record members as when the jaw movements were recorded;

inserting a pair of collinear styli into the physical impressions of said two record members;

placing a pair of blank upper joint members in positions intermediate to said two record members and on a common axis therewith;

positioning a pair of round-headed rotatable drills beneath said pair of blank upper joint members, respectively, forming initial openings in said blank upper joint members, and inserting the ends of said drills into said initial openings so that the radius centers of said drills are precisely aligned with the common axis of said two styli;

and thereafter while maintaining the fixed positions of said pair of blank upper joint members relative to said two record members, and the fixed positions of said pair of drills relative to said two styli, moving said styli in the physical impressions in said record members so as to enlarge the initial openings in said blank upper joint members to thereby represent the recorded jaw movement information in a transferred and converted form.

6. Information transfer apparatus for converting recorded jaw movement information to a form more conveniently usable in reproducing the jaw movements, comprising, in combination:

an upper transfer assembly and a lower transfer assembly having coacting means providing a static position reference for both of said assemblies to a common hinge axis and to a relative lateral position representing centric, said assemblies being also relatively movable whereby their respective hinge axes become separated from each other;

means for removably securing a set of three physical-impression type record members to the upper transfer assembly in fixed positions thereon, two of said record members being laterally disposed and aligned on the hinge axis of said upper transfer assembly, the third of said record members being centrally and frontally located;

a set of three styli secured in fixed positions to the lower transfer assembly and cooperable with the record members for guiding the transfer assemblies in a three-dimensional pattern of relative movement in accordance with the information stored in said record members;

a pair of blank upper joint members fixedly supported from the upper transfer assembly in positions on the hings axis of said upper transfer assembly and intermediate to said two record members;

a pair of rotatable condyle drills supported from the lower transfer assembly in fixed positions thereon, beneath said blank upper joint members, said condyle drills having hemispherical cutting ends which are alignable so that their radius centers lie precisely on the hinge axis of said lower transfer assembly;

and means for drivingly rotating said condyle drills to form respective openings in said pair of upper joint members so as to store therein, in a converted form, the information transferred from said three record members.

7. Information transfer apparatus as claimed in claim 6 wherein said two record members are disposed parallel to each other and perpendicular to the hinge axis of said upper transfer assembly, and the corresponding two styli are collinear to each other and to the hinge axis of said lower transfer assembly.

8. Information transfer apparatus as claimed in claim

7 wherein said third record member is disposed essentially in a common plane with the hinge axis of said upper transfer assembly, the third of said styli being aligned perpendicular both to said third record member and to said hinge axis.

9. Apparatus as claimed in claim 7 which includes means for selectively retracting said two styli while said two record members are being positioned.

References Cited

UNITED STATES PATENTS

| | | | |
|---|---|---|---|
| 2,371,795 | 3/1945 | Bodine | 32—32 |
| 3,052,030 | 9/1962 | Spence | 32—32 |
| 3,206,852 | 9/1965 | Swanson | 32—32 |
| 3,350,782 | 11/1967 | Goichet | 32—32 |
| 3,256,523 | 6/1966 | De Pietro | 32—19 XR |
| 3,321,832 | 5/1967 | Weisberg | 32—32 |

LOUIS G. MANCENE, *Primary Examiner.*

H. DINITZ, *Assistant Examiner.*